(12) United States Patent
Ohara et al.

(10) Patent No.: US 12,500,678 B2
(45) Date of Patent: Dec. 16, 2025

(54) INFORMATION PROCESSING SYSTEM, DELAY CONTROL DEVICE, INFORMATION PROCESSING METHOD AND PROGRAM

(71) Applicant: NTT, Inc., Tokyo (JP)

(72) Inventors: Takuya Ohara, Musashino (JP); Takuya Oda, Musashino (JP); Fumikazu Inuzuka, Musashino (JP); Takafumi Tanaka, Musashino (JP); Masayuki Shimoda, Musashino (JP)

(73) Assignee: NTT, Inc., Tokyo (JP)

(*) Notice: Subject to any disclaimer, the term of this patent is extended or adjusted under 35 U.S.C. 154(b) by 313 days.

(21) Appl. No.: 18/028,389

(22) PCT Filed: Sep. 29, 2020

(86) PCT No.: PCT/JP2020/036867
§ 371 (c)(1),
(2) Date: Mar. 24, 2023

(87) PCT Pub. No.: WO2022/070249
PCT Pub. Date: Apr. 7, 2022

(65) Prior Publication Data
US 2024/0031045 A1  Jan. 25, 2024

(51) Int. Cl.
*H04B 17/364* (2015.01)
*H04B 17/10* (2015.01)
(52) U.S. Cl.
CPC ......... *H04B 17/364* (2015.01); *H04B 17/104* (2015.01)

(58) Field of Classification Search
CPC .................. H04B 17/364; H04B 17/104
See application file for complete search history.

(56) References Cited

U.S. PATENT DOCUMENTS

| | | |
|---|---|---|
| 6,678,524 B1 | 1/2004 | Hansson et al. |
| 6,914,972 B1 | 7/2005 | Baumeister et al. |
| (Continued) | | |

FOREIGN PATENT DOCUMENTS

| | | |
|---|---|---|
| EP | 3041311 A1 | 7/2016 |
| JP | H10117215 A | 5/1998 |
| (Continued) | | |

OTHER PUBLICATIONS

Ramesh Govindan et al., An Architecture for Stable, Analyzable Internet Routing, IEEE Network, vol. 13, issue 1, pp. 29-35, 1999.
(Continued)

*Primary Examiner* — Duc C Ho
(74) *Attorney, Agent, or Firm* — Harness, Dickey & Pierce, P.L.C.

(57) ABSTRACT

One aspect of the present invention is an information processing system including a computing machine installed in a computing machine base, a first transmission/reception device connected to the computing machine, a second transmission/reception device installed in a user base used by a user, a device connected to the second transmission/reception device, and a delay control device configured to measure a delay amount generated between the first transmission/reception device and the second transmission/reception device and control the measured delay amount.

9 Claims, 23 Drawing Sheets

(56) References Cited

U.S. PATENT DOCUMENTS

| | | | |
|---|---|---|---|
| 7,519,049 | B2 | 4/2009 | Masuda |
| 7,822,065 | B2 | 10/2010 | Lu |
| 8,719,534 | B1 | 5/2014 | Ray, III et al. |
| 9,141,420 | B2 | 9/2015 | Chang et al. |
| 9,146,769 | B1 | 9/2015 | Shankar et al. |
| 9,785,478 | B1 | 10/2017 | Babu B R et al. |
| 11,089,105 | B1 | 8/2021 | Karumbunathan et al. |
| 11,301,407 | B2 | 4/2022 | Sen et al. |
| 2003/0184651 | A1 | 10/2003 | Ohsawa et al. |
| 2007/0079307 | A1 | 4/2007 | Dhawan et al. |
| 2008/0235361 | A1 | 9/2008 | Crosbie et al. |
| 2009/0240790 | A1 | 9/2009 | Utsunomiya et al. |
| 2010/0042636 | A1 | 2/2010 | Lu |
| 2011/0126047 | A1 | 5/2011 | Anderson et al. |
| 2012/0117563 | A1 | 5/2012 | Chang et al. |
| 2013/0262390 | A1 | 10/2013 | Kumarasamy et al. |
| 2014/0019621 | A1 | 1/2014 | Khan et al. |
| 2014/0181984 | A1 | 6/2014 | Kundu et al. |
| 2014/0258533 | A1 | 9/2014 | Antony |
| 2015/0363219 | A1 | 12/2015 | Kasturi et al. |
| 2017/0235817 | A1 | 8/2017 | Deodhar et al. |
| 2018/0191601 | A1 | 7/2018 | Micallef |
| 2019/0042325 | A1 | 2/2019 | Nair |
| 2019/0327144 | A1 | 10/2019 | Tembey et al. |
| 2019/0339320 | A1 | 11/2019 | Dzafic |
| 2020/0218684 | A1 | 7/2020 | Sen et al. |
| 2020/0412657 | A1 | 12/2020 | Jang et al. |
| 2022/0158756 | A1 | 5/2022 | Wang et al. |
| 2024/0028552 | A1* | 1/2024 | Ohara .................. H04B 1/38 |

FOREIGN PATENT DOCUMENTS

| | | |
|---|---|---|
| JP | 2003535526 A | 11/2003 |
| JP | 2005064970 A | 3/2005 |
| JP | 2006527541 A | 11/2006 |
| JP | 2010521761 A | 6/2010 |
| JP | 2012505561 A | 3/2012 |
| JP | 2015065527 A | 4/2015 |
| JP | 2015527649 A | 9/2015 |
| KR | 10-2014-0003200 A | 1/2014 |
| WO | WO-01/93607 A1 | 12/2001 |
| WO | WO-2004111775 A2 | 12/2004 |
| WO | WO-2010041582 A1 | 4/2010 |
| WO | WO-2015029416 A1 | 3/2015 |
| WO | WO-2020143380 A1 | 7/2020 |

OTHER PUBLICATIONS

Yang Chen et al., Optical Burst Switching: A New Area in Optical Networking Research, IEEE Network, vol. 18, issue 3, pp. 16-23, 2004.

Aten International Co., Ltd. KE6920 datasheet, ver. 01, Jun. 17, 2020, 1-5, https://assets.aten.com/product/spec_sheet/JP/ke6920-6922_ver01j.pdf, ATEN Product Information KE6920.

Takamichi Nishijima et al., On the Impact of Network Environment on Remote Desktop Protocols, IEICE Technical Report CQ2012-21 (Jul. 2012), 2012, pp. 23-28.

Bijoy Chand Chatterjee et al., Routing and Wavelength Assignment for WDM-based Optical Networks, Springer, pp. 35-43, vol. 410, 2017.

Wei Lu et al., Dynamic Service Provisioning of Advance Reservation Requests in Elastic Optical Networks, Journal of Lightwave Technology, vol. 31, Issue. 10, 2013, pp. 1621-1627.

M. Jinno et al., An Overview of Elastic Optical Networks, Proceedings of the 2013 IEICE Communications Society Conference, 2013, p. SS-98-SS-99.

Pegah Afsharlar et al., Routing and Spectrum Assignment with Delayed Allocation in Elastic Optical Networks, Journal of Optical Communications and Networking, 2017, pp. 1-10.

K. Yamaguchi et al., MXN Wavelength Selective Switches Using Beam Splitting By Space Light Modulators, IEEE Photonics Journal, vol. 8, No. 1, Feb. 2016.

R. A. Wagner and S. E. Dreyfus, The Steiner Problem in Graphs, Networks 1, Dreyfus and Wagner, pp. 195-207, 1972.

Y. Liu et al., The Degree-Constrained Multicasting Algorithm Using Ant Algorithm, Proceedings of the 10th International Conference on Telecommunications, 2003, pp. 370-374.

Ryan Shea and Jiangchuan Liu, Cloud Gaming: Architecture and Performance, IEEE Network . Jul./Aug. 2013, IEEE 2013, pp. 16-21.

International Search Report, issued in PCT/JP2020/036303, mailed on Feb. 2, 2021; ISA/JP.

International Search Report issued in PCT/JP2020/039655, mailed on Feb. 16, 2021; ISA/JP.

* cited by examiner

INFORMATION PROCESSING SYSTEM, DELAY CONTROL DEVICE, INFORMATION PROCESSING METHOD AND PROGRAM

CROSS-REFERENCE TO RELATED APPLICATIONS

This application is a 371 U.S. National Phase of International Application No. PCT/JP2020/036867, filed on Sep. 29, 2020. The entire disclosure of the above application is incorporated herein by reference.

TECHNICAL FIELD

The present invention relates to techniques of an information processing system, a delay control device, an information processing method, and a program.

BACKGROUND ART

A user interface (UI) device such as a display, a keyboard, a mouse, or an operation controller is connected to a computing machine, a game machine, or the like (hereinafter referred to as "computing machine"), and the computing machine is operated by use of the UI device. In many cases, as illustrated in FIG. 20, a UI device 902 at hand of a user is connected to a computing machine 901 that is also installed at hand (in a user base 900) in a wired or wireless manner. Furthermore, a sensor 903 that detects movement of a hand, a face, a body, or the like of a user US may be connected to the computing machine 901 in a wired or wireless manner. FIG. 20 is a diagram illustrating a configuration example in which a computing machine and a UI device in a conventional technique are directly connected.

A device called keyboard/video/mouse (KVM) extender (hereinafter referred to as extender) is used as a device that enables a UI device to be installed at a place physically distant from a computing machine. In the configuration example of FIG. 21, the UI device 902 at hand is connected to an extender 904, and is connected to a computing machine 911 in which an opposite extender 912 is installed via a transmission path 915. Note that the computing machine 911 and the extender 912 are installed, for example, in a computing machine base 910. FIG. 21 is a diagram illustrating an example of connection between a UI device and a computing machine using extenders in a conventional technique. In addition, in a configuration example using extenders, in a case where there are a plurality of computing machine bases 910-1 to 910-3 as illustrated in FIG. 22, a switch 921 switches connection between the extender 904 in the user base 900 and the computing machine bases 910-1 to 910-3. FIG. 22 is a diagram illustrating another example of connection between a UI device and a computing machine using extenders in the conventional technique.

In addition, another conventional technique that enables installation of a UI device and a computing machine at physically distant places includes a remote desktop function (for example, see Non Patent Literature 1). FIG. 23 is a diagram illustrating a configuration example of remote desktop in the conventional technique. UI devices (902-1 to 902-3) at hand (in user bases 900-1 to 900-3) of users (US1 to US3) are connected to computing machines (901-1 to 901-3) at hand, and the computing machines are connected to computing machines (911-1 to 911-3) at remote places (for example, in a computing machine base 910A) via networks (915-1 to 915-3) such as the Internet. In the remote desktop, it is possible to operate a program executed on a remote computing machine by use of a UI device at hand, and it is also possible to change a computing machine as a connection destination.

CITATION LIST

Non Patent Literature

Non Patent Literature 1: Takamichi Nishijima, Yuto Nakai, Hiroyuki Osaki, et al. "On the Impact of Network Environment on Remote Desktop Protocols", IEICE Technical Report CQ2012-21 (2012 July), Institute of Electronics, Information and Communication Engineers, 2012, p 23-28

SUMMARY OF INVENTION

Technical Problem

In a case where a user interface device and a computing machine are installed at distant places, a delay occurs in a communication path connecting the user interface device and the computing machine. For delay-sensitive applications, the delay needs to be controlled, but the conventional techniques cannot control the delay.

In view of the above circumstances, an object of the present invention is to provide a technique capable of adjusting a delay between a user interface and a computing machine when the user interface and the computing machine are installed at distant places.

Solution to Problem

An aspect of the present invention is an information processing system including: a computing machine installed in a computing machine base; a first transmission/reception device connected to the computing machine; a second transmission/reception device installed in a user base used by a user; a device connected to the second transmission/reception device; and a delay control device configured to measure a delay amount generated between the first transmission/reception device and the second transmission/reception device and control the measured delay amount.

An aspect of the present invention is a delay control device configured to measure a delay amount generated between a first transmission/reception device that is connected to a computing machine installed in a computing machine base and a second transmission/reception device that is installed in a user base used by a user and to which a device used by the user is connected, and to control the measured delay amount.

An aspect of the present invention is an information processing method in an information processing system including a computing machine installed in a computing machine base, a first transmission/reception device connected to the computing machine, a second transmission/reception device installed in a user base used by a user, a device connected to the second transmission/reception device, and a delay control device, the information processing method including measuring, by the delay control device, a delay amount generated between the first transmission/reception device and the second transmission/reception device, and controlling the measured delay amount.

An aspect of the present invention is a program for causing a computer of a delay control device in an information processing system, which includes a computing machine installed in a computing machine base, a first transmission/reception device connected to the computing machine, a second transmission/reception device installed in a user base used by a user, a device connected to the second transmission/reception device, and the delay control device, to execute measuring a delay amount generated between the first transmission/reception device and the second transmission/reception device, and controlling the measured delay amount.

Advantageous Effects of Invention

According to the present invention, it is possible to adjust a delay between a user interface and a computing machine when the user interface and the computing machine are installed at distant places.

DESCRIPTION OF EMBODIMENTS

Hereinafter, embodiments of the present invention will be described with reference to the drawings.

First Embodiment

Figure 1:
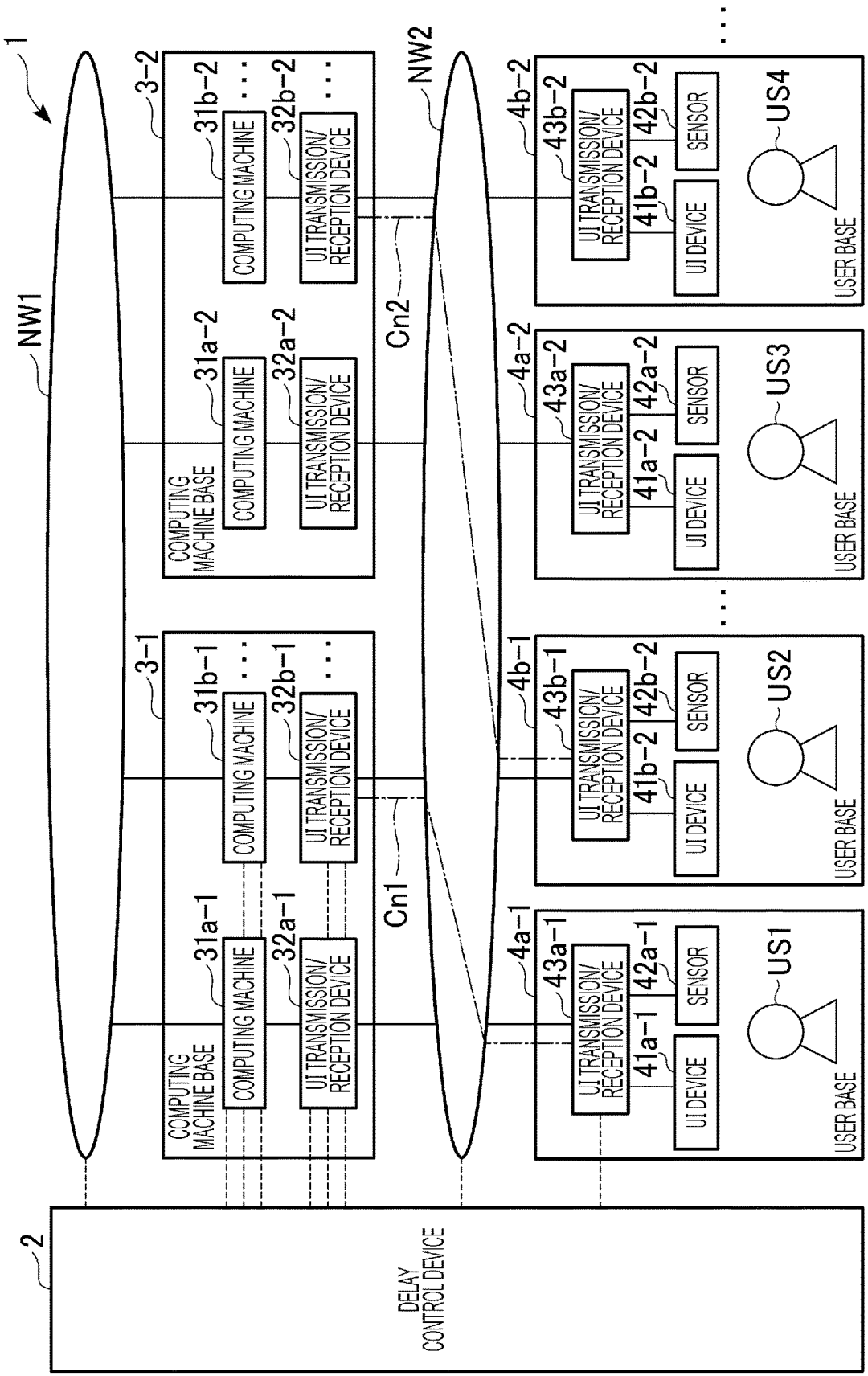
FIG. 1 is a diagram illustrating an example of an overall configuration of an information processing system according to an embodiment.

FIG. 1 is a diagram illustrating an example of an overall configuration of an information processing system according to the present embodiment. As illustrated in FIG. 1, an information processing system 1 includes a delay control device 2, computing machine bases 3 (3-1, 3-2, . . . , 3-n (n is an integer of 1 or more)), user bases 4 (4a-1, 4b-1, 4a-2, 4b-2, . . . , 4a-m (m is an integer of 1 or more), 4b-m), a first network NW1, and a second network $NW^2$ (network).

One or more computing machines 31 and one or more UI transmission/reception devices 32 are installed in each of the computing machine bases 3. In the example of FIG. 1, the computing machines 31 (31a-n, 31b-n, . . . ) and the UI transmission/reception devices 32 (32a-n, 32b-n, . . . ) (first transmission/reception devices) are installed in each of the computing machine bases 3. Note that the computing machines 31 and the UI transmission/reception devices 32 may be integrated. In FIG. 1, illustration of a part of components installed in the computing machine bases 3 is omitted. Note that the components installed in the computing machine bases 3 will be described with reference to FIG. 2 and the like.

In each of the user bases 4, a UI device 41 (41a-m, 41b-m, . . . ), a sensor 42 (42a-m, 42b-m, . . . ), and a UI transmission/reception device 43 (43a-m, 43b-m, . . . ) (second transmission/reception device) are installed.

The information processing system 1 includes one or more computing machine bases 3.

The delay control device 2 measures a delay amount generated between the UI transmission/reception devices (32, 43) and performs delay adjustment control. The delay control device 2 controls a connection relationship between the UI transmission/reception devices 43 in the user bases 4 and the UI transmission/reception devices 32 in the computing machine bases 3. The delay control device 2 is connected to the computing machines 31 and the UI transmission/reception devices 32 in the computing machine bases 3, communication devices (not illustrated) constituting the second network NW2, and the UI transmission/reception devices 43 in the user bases 4, and can confirm setting information of each device and change the settings. The delay control device 2 is connected to the computing machine bases 3, the user bases 4, the first network NW1, and the second network NW$^2$ in a wired or wireless manner.

Note that the delay control device 2 includes a processor such as a central processing unit (CPU) and a memory. Note that all or some of the functions of the delay control device 2 may be implemented by use of hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disk, a ROM, a CD-ROM, or a semiconductor storage device (for example, a solid state drive (SSD)), or a storage device such as a hard disk or a semiconductor storage device built in a computer system. The program may be transmitted via an electric communication line.

The first network NW1 is, for example, the Internet and includes a communication network. In addition, the first network NW1 may have an authentication function. Furthermore, the first network NW1 may include a communication device.

The second network NW$^2$ may be a wired network or a wireless network, may have any physical or logical topology, and may be a circuit switched network or a packet switched network. Furthermore, the second network NW$^2$ may include a communication device.

Next, the computing machine bases 3 will be described.

Each of the computing machine bases 3 is, for example, a data center, a communication building, a server room, or the like.

Each of the computing machines 31 may be a physical computing machine or a logical computing machine (virtual computing machine). In the case of the virtual computing machine, for example, a CPU, a graphics processing unit (GPU), a memory, a storage, and the like are virtualized. Furthermore, each of the computing machines 31 may be a game machine. Each of the computing machines 31 is connected to another computing machine or a server (not illustrated) of a data center via the first network NW1. The computing machines 31 are connected to the UI transmission/reception devices 32, and user interface information such as a display signal and operation information of the computing machines 31 is exchanged. Specific examples of the display signal include signals of High-Definition Multimedia Interface (HDMI, registered trademark), DisplayPort, and the like, and specific examples of a signal of the operation information include a signal of Universal Serial Bus (USB). In addition, specific examples of a signal obtained by combination of the display signal and the operation information include signals of USB4 and Thunderbolt (registered trademark) 3. Note that one user may boost and use a plurality of physical GPUs in cooperation.

Each of the UI transmission/reception devices 32 receives the display signal and the operation information, and converts the display signal and the operation information into a signal format capable of performing long-distance communication via the second network NW2. In addition, the UI transmission/reception devices 32 are connected to the UI transmission/reception devices 43 in the user bases 4 via the second network NW2. The signal format capable of performing long-distance communication is compliant with, for example, Ethernet (registered trademark) or the Optical Transport Network (OTN). Note that a configuration example of each of the UI transmission/reception devices 32 will be described later.

Next, the user bases 4 will be described.

Each of the user bases 4 is a base where a user US (US1, . . . ) works or play games or the like, and is, for example, a home, a company, a business rental space, a game arcade, or the like.

Each of the UI devices 41 is a device related to a user interface, and is, for example, a display, a keyboard, a mouse, an operation controller (actuator), a camera, a virtual reality (VR) headset, an augmented reality (AR) headset, a microphone, a speaker, or the like. In addition to the above devices, each of the UI devices 41 may be any device that inputs and outputs the five human senses (touch, sight, hearing, smell, and taste) to and from a corresponding one of the computing machines 31. The UI devices 41 and the UI transmission/reception devices 43 are connected in a signal format such as HDMI, DisplayPort, or USB, for example.

Each of the sensors 42 is, for example, a sensor that detects movement of a hand, a face, a body, or the like of a user US, a position sensor, an altitude sensor, a speed sensor, an acceleration sensor, a temperature sensor, a humidity sensor, a pressure sensor, a vibration sensor, an optical sensor, a sound sensor, an electric field sensor, a magnetic field sensor, or the like. The sensors 42 and the UI transmission/reception devices 43 are connected in a signal format such as USB, for example.

The UI transmission/reception devices 43 are connected to the UI transmission/reception devices 32 in the computing machine bases 3 via the second network NW2. Note that the second network NW$^2$ has a switching function, and can flexibly change the connection relationship between the UI transmission/reception devices 32 in the computing machine bases 3 and the UI transmission/reception devices 43 in the user bases 4. Note that a plurality of UI signals may be multiplexed in an output of the UI transmission/reception devices 43. Note that at least one of the UI devices 41 or the sensors 42 is only required to be connected to each of the UI transmission/reception devices 43.

Next, an example of connection between the user bases 4 and the computing machine bases 3 will be described.

In the example of FIG. 1, two users US1 and US2 use the computing machines 31 via the second network NW2.

In a first path Cn1, the UI transmission/reception device 43*a*-1 in the user base 4*a*-1 and the UI transmission/reception device 32*b*-1 in the computing machine base 3-1 are connected via the second network NW2. In a second path Cn2, the UI transmission/reception device 43*b*-1 in the user base 4*b*-1 and the UI transmission/reception device 32*b*-2 in the computing machine base 3-2 are connected via the second network NW2. Note that the connection relationship between the UI transmission/reception devices (32, 43) is controlled by the delay control device 2.

Next, a configuration example of each computing machine base and the second network will be described.

Figure 2:
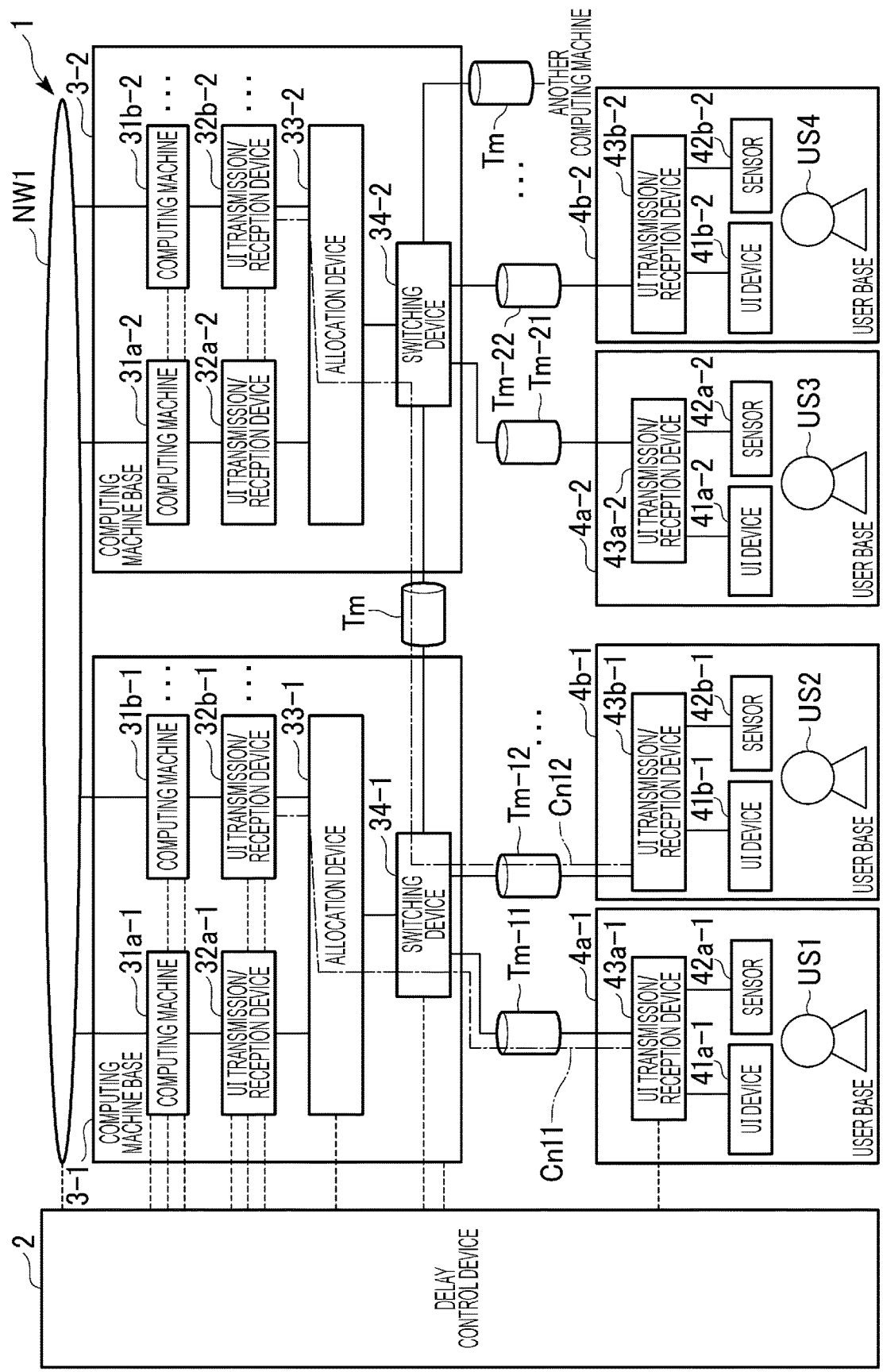
FIG. 2 is a diagram illustrating a configuration example of a computing machine base and an example of a second network according to the embodiment.

FIG. 2 is a diagram illustrating the configuration example of each computing machine base and an example of the second network according to the present embodiment. In the example of FIG. 2, in each of the computing machine bases 3 (3-1, 3-2), for example, at least one computing machine 31 (31*a*-1, 31*b*-1, 31*a*-2, 31*b*-2), at least one UI transmission/reception device 32 (32*a*-1, 32*b*-1, 32*a*-2, 32*b*-2), an allocation device 33 (33-1, 33-2), and a switching device 34 (34-1, 34-2) are installed.

The UI transmission/reception devices 43 in the user bases 4 are connected to the switching devices 34 in the computing machine bases 3 via transmission paths Tm (Tm-11, Tm-12, . . . , Tm-21, Tm-22, . . . ). Each of the transmission paths Tm may be, for example, a colored interface (IF) based on a wavelength division multiplexing (WDM) signal or a grey IF based on a non-WDM signal. Each of the switching devices 34 is also connected to another switching device 34 in another computing machine base 3 via one of the transmission paths Tm, and can flexibly change the connection relationship between the UI transmission/reception devices (32, 43). Each of the switching devices 34 is connected to a corresponding one of the allocation devices 33 in the same computing machine base 3, and can set which one of the computing machines 31 is connected in the computing machine base 3.

The switching devices 34 (switches) switch the transmission paths Tm under the control of the delay control device 2. Each of the switching devices 34 is, for example, an optical switch, an electric switch, or a robot panel switch.

Each of the allocation devices 33 (switches) switches one of the UI transmission/reception devices 32 to be connected to one of the UI transmission/reception devices 43 in the user bases 4 under the control of the delay control device 2. Each of the allocation devices 33 is, for example, an optical switch, an electric switch, or a robot panel switch.

In the example of FIG. 2, in a case where the first user US1 uses the user base 4a-1, the UI transmission/reception device 43a-1 in the user base 4a-1 is connected to the UI transmission/reception device 32b-1 in the computing machine base 3-1 via the transmission path Tm-11, and the switching device 34-1 and the allocation device 33-1 in the computing machine base 3-1, as indicated by a path Cn11, under the control of the delay control device 2.

Furthermore, in a case where the second user US2 uses the user base 4b-1, the UI transmission/reception device 43b-1 in the user base 4b-1 is connected to the UI transmission/reception device 32b-2 in the computing machine base 3-2 via the transmission path Tm-12, the switching device 34-1 in the computing machine base 3-1, the transmission path Tm, and the switching device 34-2 and the allocation device 33-2 in the computing machine base 3-2, as indicated by a path Cn12, under the control of the delay control device 2.

In this case, the second network NW² is a network having a circuit switching function (hereinafter referred to as "circuit switched network"). The circuit switched network is compliant with, for example, the Optical Transport Network (OTN) or Synchronous Digital Hierarchy (SDH). Note that the circuit switched network includes the transmission paths Tm, Tm-11, Tm-12, . . . , Tm-21, Tm-22, . . . , and the like.

For example, in the remote desktop function in the conventional techniques, UI information is exchanged by a network using an Ethernet switch or a router, and thus media access control address (MAC) frames and Internet protocol (IP) packets are switched throughout the network.

At the time of these switching operations, signals are temporarily stored in a switching queue, and are switched at a timing when switching is possible, and thus, the delay time varies.

On the other hand, in the circuit switched network according to the present embodiment, since one user can occupy the communication capacity and the delay time is constant, the communication between the UI transmission/reception devices 32 and the UI transmission/reception devices 43 is stabilized. One user can occupy the communication capacity because time slots of communication are allocated by time division multiplexing. The delay time is constant because the allocated time slots are regularly switched without delay even at the time of switching.

Note that the circuit switched network also includes a packet switched network that emulates circuit switching. In the packet switched network that emulates circuit switching, priority is given to packets to secure a bandwidth, and the packets are preferentially switched according to the priority of the packets at the time of switching, so that the delay time due to switching is stabilized.

Next, a case where three users use the information processing system will be described.

Figure 3:
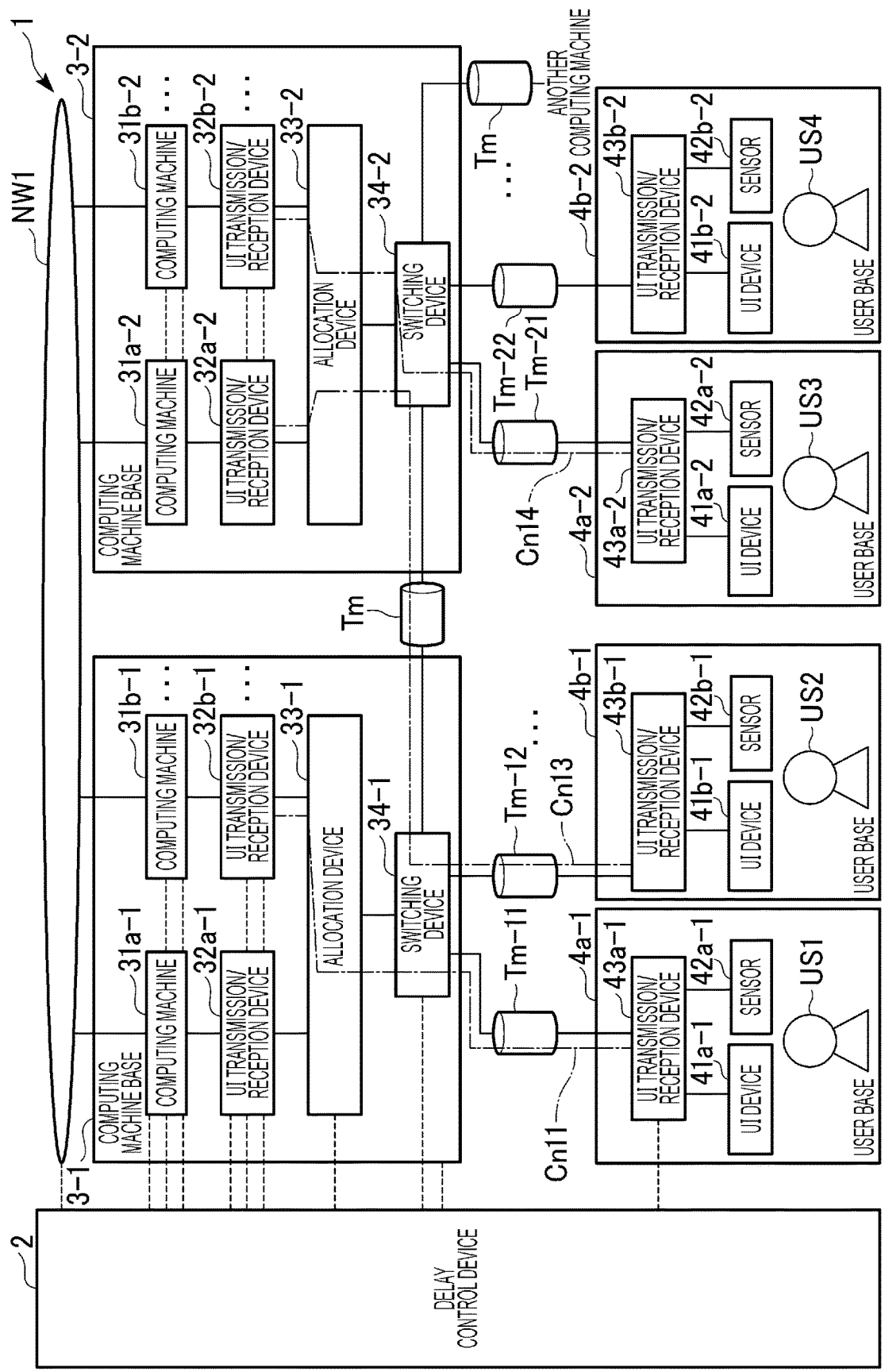
FIG. 3 is a diagram illustrating a connection example in a case where three users use the information processing system.

FIG. 3 is a diagram illustrating a connection example in the case where three users use the information processing system. In the example of FIG. 3, as indicated by the path Cn11, the UI transmission/reception device 43a-1 in the user base 4a-1 is connected to the UI transmission/reception device 32b-1 in the computing machine base 3-1, and the first user US1 uses the computing machine 31b-1. In addition, as indicated by a path Cn13, the UI transmission/reception device 43b-1 in the user base 4b-1 is connected to the UI transmission/reception device 32a-2 in the computing machine base 3-2, and the second user US2 uses the computing machine 31a-2. Furthermore, as indicated by a path Cn14, the UI transmission/reception device 43a-2 in the user base 4a-2 is connected to the UI transmission/reception device 32b-2 in the computing machine base 3-2, and a third user US3 uses the computing machine 31b-2.

In such a case, the delay time varies for each user due to a transmission delay in the transmission paths Tm (Tm-11, Tm-12, Tm-21) connecting the UI transmission/reception devices 43 in the user bases 4 of the users and the UI transmission/reception devices 32 in the computing machine bases 3 and a processing delay in the devices constituting the second network NW2.

Figure 4:
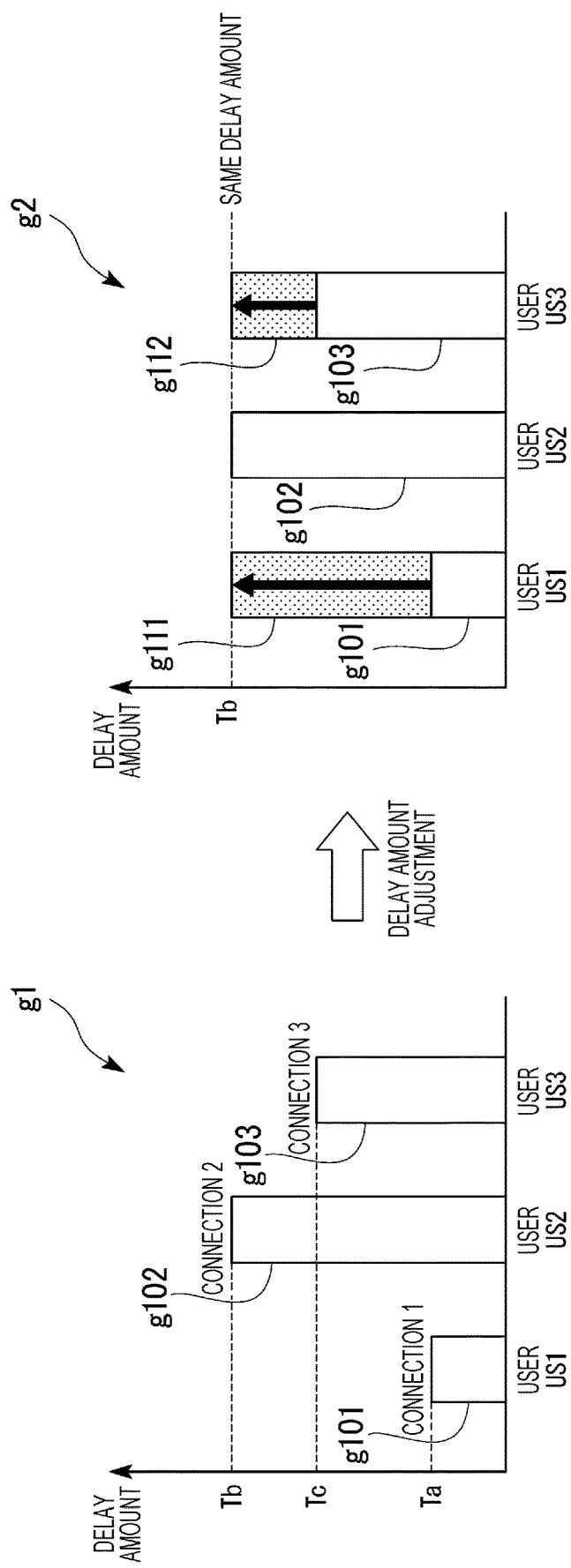
FIG. 4 is a diagram illustrating an example of delay amounts before adjustment and delay amounts after adjustment.

FIG. 4 is a diagram illustrating an example of delay amounts before adjustment and delay amounts after adjustment. The horizontal axis represents the users and the vertical axis represents the delay amounts (for example, (ms)) in each of a delay amount state g1 indicating a delay amount before adjustment for each user and a delay amount state g2 indicating a delay amount after adjustment for each user.

As in the delay amount state g1 indicating the delay amount before adjustment for each user, a delay amount g101 for the first user US1 is Ta, which is the smallest, a delay amount g102 for the second user US2 is Tb, which is the largest, and a delay amount g103 for the third user US3 is Tc, which has a magnitude between Ta and Tb.

In a case where these users use a delay-sensitive application, the delay varies for each user, which causes unfairness. The delay-sensitive application includes, for example, online gaming, eSports, online stock trading, and the like. For example, in the case of online gaming, among users who are engaged in a battle, a user with a lower delay is most advantageous because an operation of the user is reflected more quickly, and, on the contrary, a user with a larger delay is more disadvantageous because an operation of the user is reflected later.

Therefore, in the present embodiment, as in the delay amount state g2 indicating the delay amount after adjustment for each user, the delay control device 2 adjusts the delay amounts to match the delay amounts with the largest delay amount. In the delay amount state g2 indicating the delay amount after adjustment for each user, the delay control device 2 controls an adjustment correction amount g111 for the path for the first user US1 to (Tb−Ta) and controls an adjustment correction amount g112 for the path for the third user US3 to (Tb−Tc).

Figure 5:
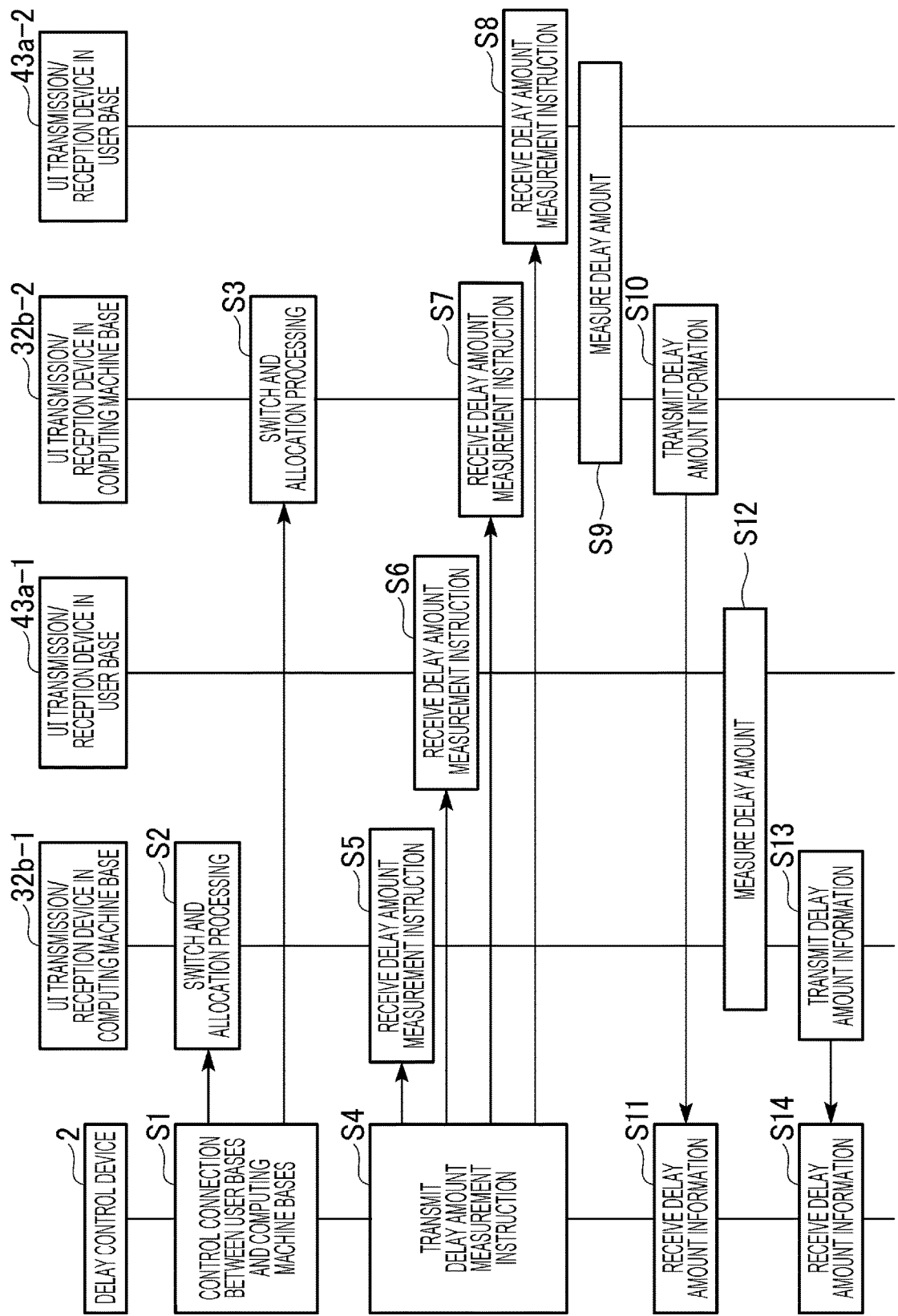
FIG. 5 is a sequence diagram of a procedure example of delay amount adjustment processing according to the embodiment.
Figure 6:
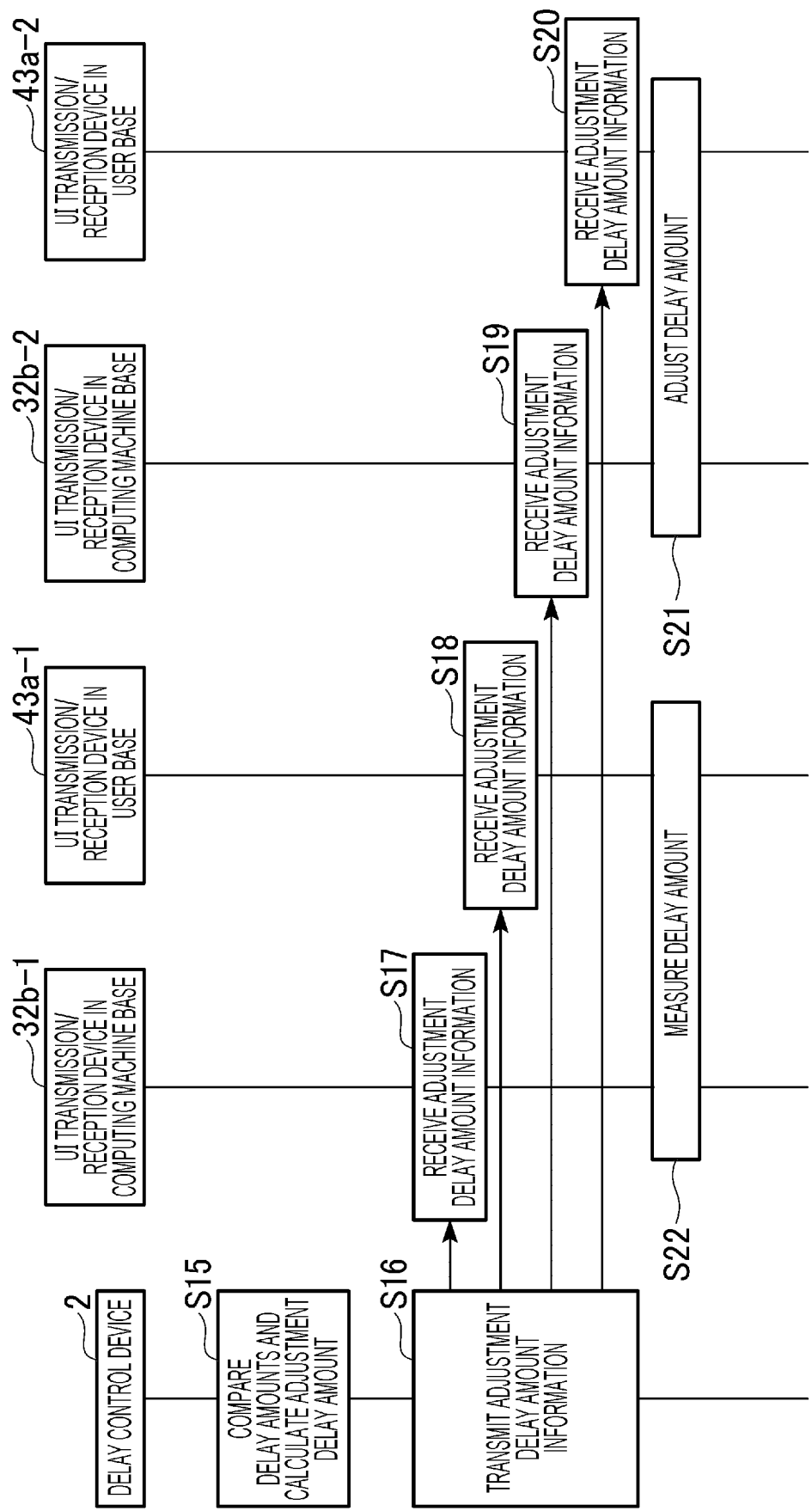
FIG. 6 is a sequence diagram of the procedure example of the delay amount adjustment processing according to the embodiment.

Here, a procedure example of the delay amount adjustment processing will be described with reference to FIGS. 5 and 6. FIGS. 5 and 6 are sequence diagrams of the procedure example of the delay amount processing according to the present embodiment. Note that, in the processing procedure example of FIG. 5, the case where there are two users will be described in order to simplify the description.

The delay control device 2 controls the switching devices 34 and the allocation devices 33 in the computing machine bases 3 so as to connect the UI transmission/reception devices 43 in the user bases 4 and the UI transmission/reception devices 32 in the computing machine bases 3 (step S1).

The switching device 34-1 and the allocation device 33-1 in the computing machine base 3-1 switch connection so as to connect the transmission path to be connected under the control of the delay control device 2, and the UI transmission/reception device 43a-1 and the UI transmission/reception device 32b-1 are connected (step S2).

The switching device 34-2 and the allocation device 33-2 in the computing machine base 3-2 switch connection so as to connect the transmission path to be connected under the control of the delay control device 2, and the UI transmission/reception device 43a-2 and the UI transmission/reception device 32b-2 are connected (step S3).

The delay control device 2 transmits a delay amount measurement instruction to the UI transmission/reception devices (32, 43) (step S4).

The UI transmission/reception devices (32, 43) receive the delay amount measurement instruction transmitted by the delay control device 2 (steps S5 to S8).

The UI transmission/reception device 43a-2 in the user base 4a-2 and the UI transmission/reception device 32b-2 in the computing machine base 3-2 measure the delay amount between the UI transmission/reception device 43a-2 and the UI transmission/reception device 32b-2 based on the received delay amount measurement instruction (step S9).

The delay amount information measured by at least one of the UI transmission/reception device 43a-2 or the UI transmission/reception device 32b-2 is transmitted to the delay control device 2. In the example of FIG. 5, the delay amount information measured by the UI transmission/reception device 32b-2 is transmitted to the delay control device 2 (step S10). The delay control device 2 receives the delay amount information transmitted by the UI transmission/reception device 32b-2 (step S11).

The UI transmission/reception device 43a-1 in the user base 4a-1 and the UI transmission/reception device 32b-1 in the computing machine base 3-1 measure the delay amount between the UI transmission/reception device 43a-1 and the UI transmission/reception device 32b-1 based on the received delay amount measurement instruction (step S12).

The delay amount information measured by at least one of the UI transmission/reception device 43a-1 or the UI transmission/reception device 32b-1 is transmitted to the delay control device 2. In the example of FIG. 5, the delay amount information measured by the UI transmission/reception device 32b-1 is transmitted to the delay control device 2 (step S13). The delay control device 2 receives the delay amount information transmitted by the UI transmission/reception device 32b-1 (step S14).

The description will be continued with reference to FIG. 6.

The delay control device 2 compares the received delay amounts and detects a delay amount having the largest delay amount. Subsequently, the delay control device 2 calculates an adjustment delay amount so as to match the delay amounts with the detected largest delay amount (step S15).

The delay control device 2 transmits the calculated adjustment delay amount information to the UI transmission/reception devices (32, 43) (step S16). Note that the delay control device 2 does not have to transmit the adjustment delay amount information to the UI transmission/reception devices (32, 43) in which the adjustment delay amount is 0, that is, the delay amount is not adjusted.

The UI transmission/reception devices (32, 43) receive the adjustment delay amount information transmitted by the delay control device 2 (steps S17 to S20).

The UI transmission/reception device 43a-2 and the UI transmission/reception device 32b-2 adjust the delay amount based on the received adjustment delay amount information (step S21). The UI transmission/reception device 43a-1 and the UI transmission/reception device 32b-1 adjust the delay amount based on the received adjustment delay amount information (step S22).

Note that the UI transmission/reception devices (32, 43) may transmit delay amount adjustment completion information indicating that the delay amounts have been adjusted to the delay control device 2.

With this processing, according to the present embodiment, the delays for the users are equalized, and the unfairness can be corrected.

Note that, as methods of delay adjustment, there are a method of giving a delay by the UI transmission/reception devices 32 (or 43), a method of giving a delay by the computing machines 31, a method of giving a delay by the communication device of the second network NW2, and the like. In addition, as a method of delay adjustment, there is also a method of reducing a delay difference by appropriately selecting a path in the second network NW2. In the adjustment of a delay amount, the delay amount may be changed for example, with instantaneous interruption of a signal between the UI transmission/reception devices (32, 43), or may be changed without instantaneous interruption.

In addition, the delay control device 2 may measure a delay amount by, for example, ODU Delay Measurement (ODU DM) defined by OTN. Furthermore, the delay control device 2 may use, for example, a method using a first in first out (FIFO) for adjusting a delay amount.

Here, an example of a method of adjusting a delay without instantaneous interruption by use of a FIFO will be described. In this method, intentionally increasing or decreasing the clock frequency of the FIFO makes it possible to adjust the delay time while signals are communicated. In this method, for example, when the frequency of a read clock is set to be higher than the frequency of a write clock, the use amount of the FIFO gradually decreases, so that the delay time can be shortened. In addition, in this method, on the contrary, when the frequency of the read clock is set to be lower than the frequency of the write clock, the use amount of the FIFO gradually increases, so that the delay time can be lengthened.

Next, an example of delay amount adjustment in a case where the number of users increases will be described.

Figure 7:
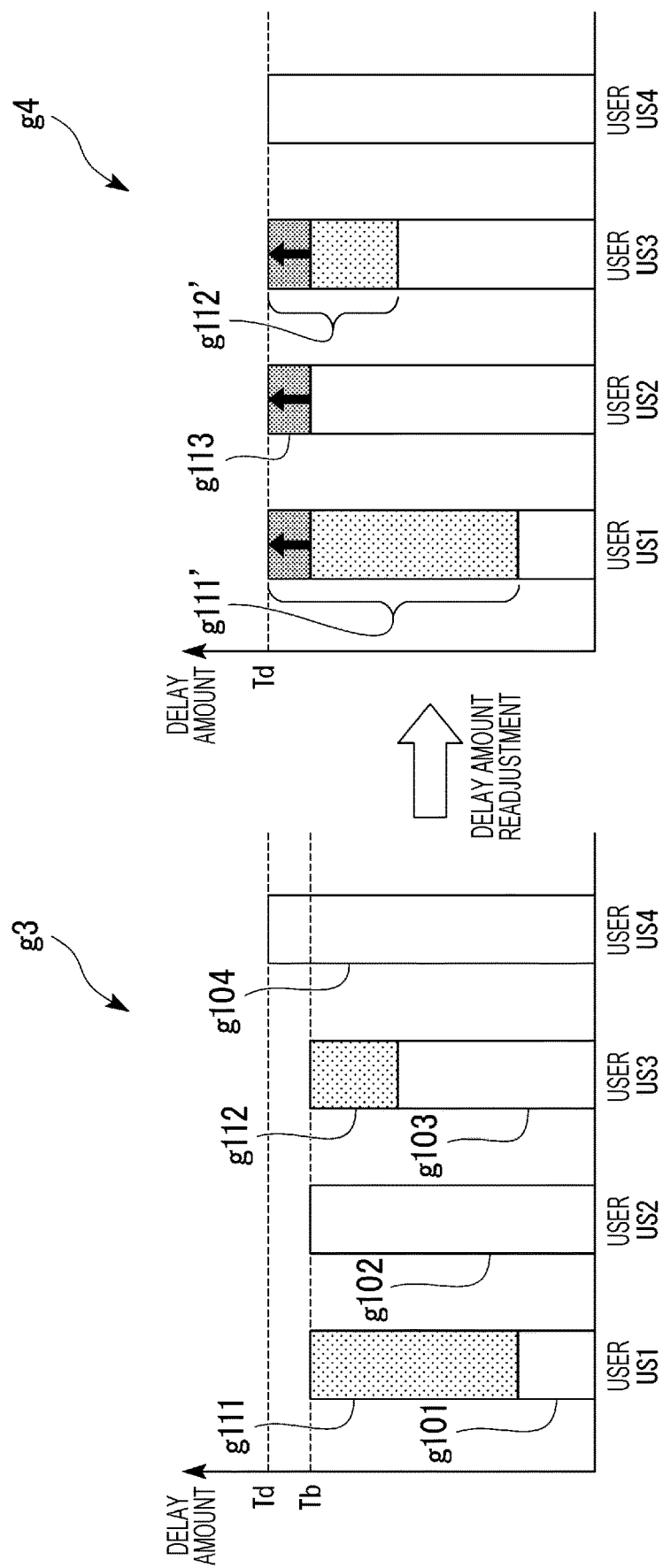
FIG. 7 is a diagram illustrating an example of delay amount adjustment in a case where the number of users increases.

FIG. 7 is a diagram illustrating the example of the delay amount adjustment in the case where the number of users increases. Note that FIG. 7 illustrates a case where a fourth user US4 increases after the delay amounts are adjusted for the three users in FIG. 4. In FIG. 7, the horizontal axis represents the users and the vertical axis represents the delay amounts (for example, (ms)) in each of an adjustment amount state g3 indicating, for each user, a delay amount before adjustment after the increase in users and a delay amount state g4 indicating, for each user, a delay amount after adjustment after the increase in users. As in the adjustment amount state g3 indicating the delay amount before adjustment for each user, a delay amount g104 for the fourth user US4 is Td, which is larger than Tb.

In this case, as in the delay amount state g4 indicating the delay amount after adjustment for each user, the delay control device 2 adjusts the delay amounts for the first user US1, the second user US2, and the third user US3 again to match the delay amounts with Td of the largest delay amount g104. As a result, in the present embodiment, the delay amounts including the delay amount for the fourth user US4, who participates later, are adjusted again, thereby achieving fairness.

Specifically, the delay control device 2 controls an adjustment correction amount g111' for the path for the first user US1 to (Td−(Tb−Ta)), controls an adjustment correction amount g113 for the path for the second user US2 to (Td−(Tb)), and controls an adjustment correction amount g112' for the path for the third user US3 to (Td−(Tb−Tc)).

For example, in a case where the number of participants increases during a gaming battle, adjusting delays without instantaneous interruption of signals makes it possible for the users to continue the gaming without being conscious that the delay amounts are adjusted.

Next, an example of delay amount adjustment in a case where the number of users decreases will be described.

Figure 8:
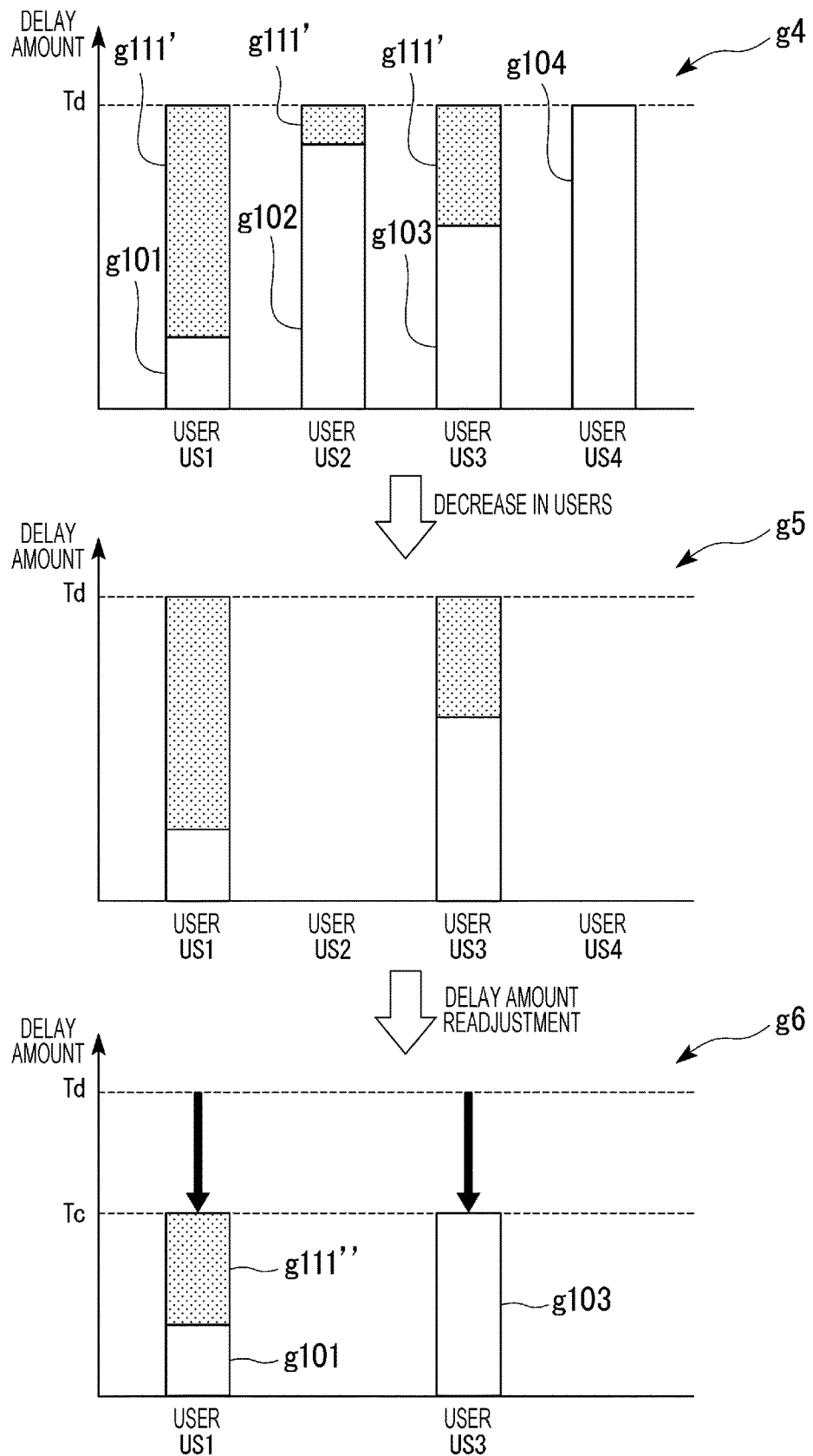
FIG. 8 is a diagram illustrating an example of delay amount adjustment in a case where the number of users decreases.

FIG. 8 is a diagram illustrating the example of the delay amount adjustment in the case where the number of users decreases. Note that FIG. 8 illustrates an example of a state (g5) in which the second user US2 and the fourth user US4 are removed from the state (g4) in which there are four users in FIG. 7, and the number of users is reduced to two. In FIG. 8, the horizontal axis represents the users and the vertical axis represents the delay amounts (for example, (ms)) in each of the delay amount state g4 indicating the delay amount after adjustment for each user, the delay amount state g5 indicating, for each user, a delay amount before delay amount adjustment after the decrease in users, and a delay amount state g6 indicating, for each user, a delay amount after delay amount adjustment after the decrease in users.

In this case, as in the delay amount state g5 indicating, for each user, the delay amount before the delay amount adjustment after the decrease in users, the first user US1 and the third user US3 are engaged in a battle in a state in which an extra delay amount (delay amount of excessive correction) is added. In a case where the number of users decreases, the delay control device 2 removes this extra delay and adjusts the delay amounts to match the delay amounts with the delay amount for the third user US3 having a larger delay amount between the two users, as in the delay amount state g6 indicating, for each user, the delay amount after delay amount adjustment after the decrease in users.

Specifically, the delay control device 2 controls an adjustment correction amount g111'' for the path for the first user US1 from (Td−(Tb−Ta)) to (Tc−Ta), and controls the correction delay amount for the path for the third user US3 so that the correction delay amount is returned to 0.

Figure 9:
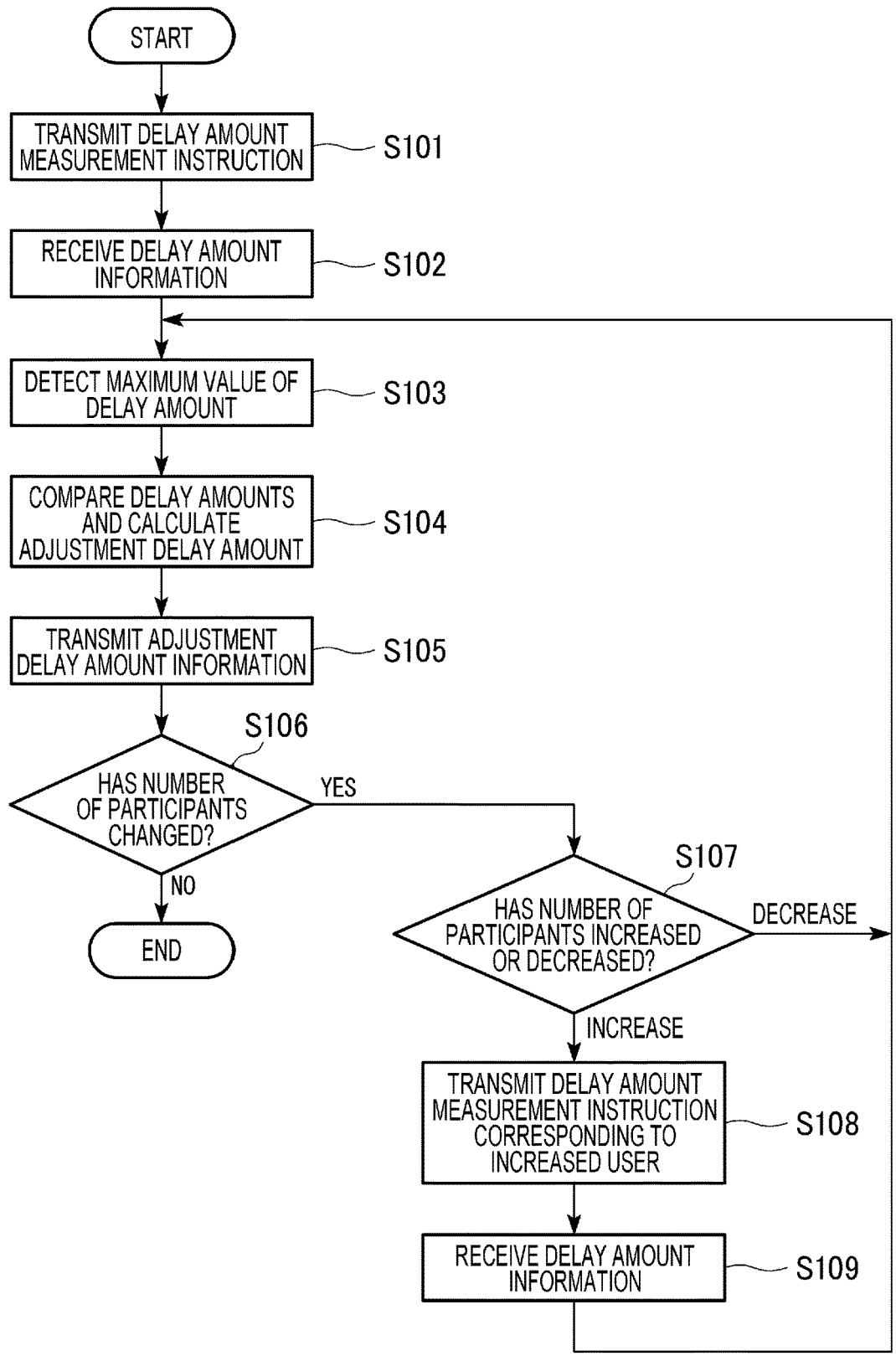
FIG. 9 is a flowchart illustrating an example of the delay amount adjustment processing in a case where the number of users changes according to the embodiment.

Here, a procedure example of the delay amount adjustment processing in a case where the number of users changes will be described. FIG. 9 is a flowchart illustrating an example of the delay amount adjustment processing in the case where the number of users changes according to the present embodiment.

The delay control device 2 transmits a delay amount measurement instruction to the UI transmission/reception devices (32, 43) (step S101). The delay control device 2 receives delay amount information transmitted by the UI transmission/reception devices (32, 43) (step S102).

The delay control device 2 detects the maximum value of the delay amount from the received delay amount information (step S103). The delay control device 2 calculates an adjustment delay amount by comparing the detected delay amounts with the delay amounts (step S104). The delay control device 2 transmits the calculated adjustment delay amount to the UI transmission/reception devices (32, 43) (step S105).

The delay control device 2 detects whether or not the number of participants has been changed (step S106). Note that the delay control device 2 may detect a change in the number of participants, for example, by detecting a user having operated one of the UI devices 41 to log in. In a case where the delay control device 2 determines that the number of participants has been changed (step S106; YES), the processing proceeds to step S107. In a case where the delay control device 2 determines that the number of participants has not been changed (step S106; NO), the processing ends.

The delay control device 2 determines whether the number of participants has increased or decreased (step S107). In a case where the delay control device 2 determines that the number of participants has decreased (step S107; decrease), the processing returns to step S103. In a case where the delay control device 2 determines that the number of participants has increased (step S107; increase), the processing proceeds to step S108.

The delay control device 2 transmits a delay amount measurement instruction to the UI transmission/reception device 43 in the user base 4 and the UI transmission/reception device 32 in the computing machine base 3 used by the increased user (step S108). The delay control device 2 receives delay amount information transmitted by the UI transmission/reception devices (32, 43) (step S109).

Note that the processing procedure and the like in FIG. 9 are examples, and the processing procedure is not limited thereto. For example, the change in the number of participants may be made by interruption processing.

As described above, in the present embodiment, with the above-described configuration and processing, the UI devices 41 and the sensors 42 in the user bases 4 are connected to the computing machines 31 in the computing machine bases 3 via the second network NW2. Furthermore, in the present embodiment, delay amounts between the UI devices 41 or the sensors 42 and the computing machines 31 are adjusted. Furthermore, in the present embodiment, the delay amounts are adjusted in a case where the number of participants increases or decreases in the middle of a game, eSports, or the like.

With this configuration, according to the present embodiment, in a case where fairness is required as in a game or eSports, or in an application that requires temporal synchronization, it is possible to adjust non-uniformity of delays for users due to conditions such as transmission paths, so that conditions with equal delays can be achieved. As a result, according to the present embodiment, it is possible to perform an operation suitable for implementing a delay-sensitive application used by a plurality of users.

In the above description, the case where delays for a plurality of users are equalized has been described. However, for example, in a case where a performance difference between computing machines used by the users is large and processing delays of the computing machines are different, the delay control device 2 may set a delay on the network side for each user so as to offset the processing delay difference between the computing machines. With this configuration, according to the present embodiment, it is possible to offset the processing delay difference between the computing machines. Furthermore, the delay control device 2 may intentionally set different delays in order to provide a handicap when there is a large difference in skills of a plurality of users. With this configuration, according to the present embodiment, a handicap can be provided.

Next, a configuration example of each UI transmission/reception device will be described.

Figure 10:
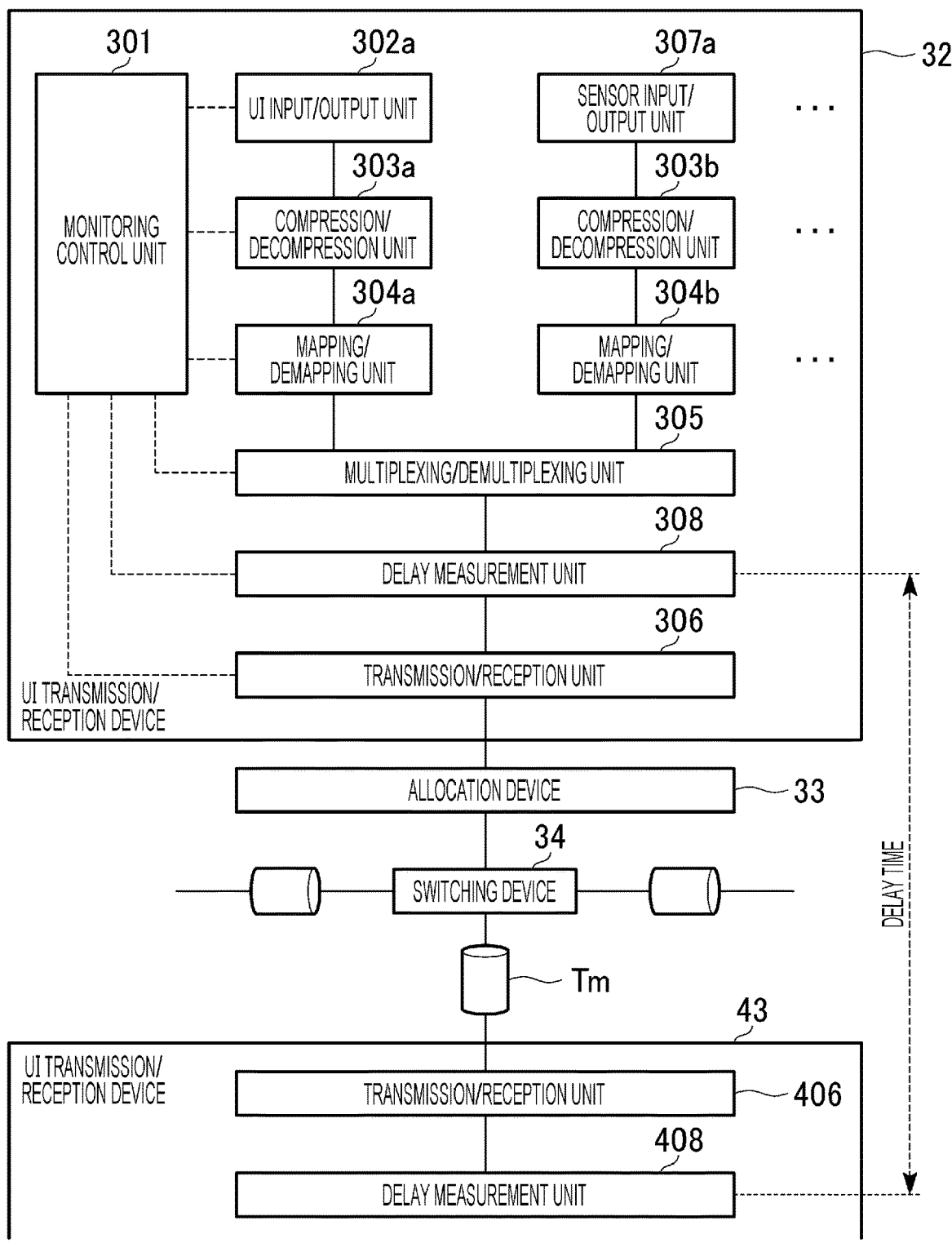
FIG. 10 is a diagram illustrating an example of a configuration of a UI transmission/reception device according to the embodiment.

FIG. 10 is a diagram illustrating an example of a configuration of each UI transmission/reception device according to the present embodiment. In the following description, a case where the UI transmission/reception device 32 and the UI transmission/reception device 43 have the same configuration will be described, but the configurations may be different. As illustrated in FIG. 10, the UI transmission/reception device 32 in one computing machine base 3 includes, for example, a monitoring control unit 301, at least one UI input/output unit 302 (302a, . . . ) or sensor input/output unit 307 (307a, . . . ), at least one compression/decompression unit 303 (303a, 303b, . . . ), at least one mapping/demapping unit 304 (304a, 304b, . . . ), a multiplexing/demultiplexing unit 305, a transmission/reception unit 306, and a delay measurement unit 308. Note that the delay measurement unit 308 may be provided between the mapping/demapping units 304 and the multiplexing/demultiplexing unit 305. Note that the configuration illustrated in FIG. 10 is an example, and the configuration is not limited thereto.

Furthermore, the UI transmission/reception device 43 in one user base 4 includes, for example, a monitoring control unit 401, at least one UI input/output unit 402 (402a, . . . ) or sensor input/output unit 407 (407a, . . . ), at least one compression/decompression unit 403 (403a, 403b, . . . ), at least one mapping/demapping unit 404 (404a, 304b, . . . ), a multiplexing/demultiplexing unit 405, a transmission/reception unit 406, and a delay measurement unit 408. Note that the delay measurement unit 408 may be provided between the mapping/demapping units 404 and the multiplexing/demultiplexing unit 405. Note that, in FIG. 10, illustration of a part of the configuration of the UI transmission/reception device 43 is omitted.

In the case of the UI transmission/reception device 32, the monitoring control unit 301 is connected to the delay control device 2 by a wired or wireless line, the transmission/reception unit 306 is connected to the allocation device 33, and the UI input/output unit 302 and the sensor input/output unit 307 are connected to the computing machine 31.

In the case of the UI transmission/reception device 43, the monitoring control unit 401 is connected to the delay control device 2 by a wired or wireless line, the transmission/reception unit 406 is connected to the transmission path Tm, the UI input/output unit 402a is connected to the UI device 41, and the sensor input/output unit 407a is connected to the sensor 42. Note that the arrangement of the transmission/reception unit 406 and the multiplexing/demultiplexing unit 405 may be reversed.

The monitoring control unit 301 is connected to each unit of the UI transmission/reception device 32, monitors the state of each unit, and changes the settings. The monitoring control unit 301 is connected to the delay control device 2, changes a connection relationship of the UI transmission/reception device 32, monitors a connection state with the computing machine 31, and sets an operation.

The monitoring control unit 401 is connected to each unit of the UI transmission/reception device 43, monitors the state of each unit, and changes the settings. The monitoring control unit 401 is connected to the delay control device 2, changes a connection relationship of the UI transmission/reception device 43, monitors the state of the UI device 41, and sets operation of the UI device 41.

The monitoring control unit 301 (401) acquires a delay amount measured by the delay measurement unit 308 (408). At least one of the monitoring control unit 301 or the monitoring control unit 401 outputs delay amount information indicating the acquired delay amount to the delay control device 2.

For example, the UI input/output unit 302a is connected to a UI signal from the computing machine 31 in the case of the computing machine base 3. The UI signal is, for example, each signal of HDMI, DisplayPort, USB, Thunderbolt, Bluetooth (registered trademark), analog audio, and digital audio. The UI input/output unit 302a is connected to the compression/decompression unit 303a.

For example, the UI input/output unit 402a is connected to the UI device 41. The UI input/output unit 402a is connected to the compression/decompression unit 403a.

For example, the sensor input/output unit 307a is connected to a UI signal from the computing machine 31. The sensor input/output unit 307a is connected to the compression/decompression unit 303b.

For example, the sensor input/output unit 407a is connected to the sensor 42. The sensor input/output unit 407 is connected to the compression/decompression unit 403b.

Each of the compression/decompression units 303 compresses and decompresses the capacity of a compressible UI signal under the control of the monitoring control unit 301. Specific examples include compression of signals of HDMI and DisplayPort as display signals, and examples of the compression method include Display Stream Compression (DSC), VESA Display Compression for Mobile (VDC-M), and Moving Picture Experts Group (MPEG) defined by Video Electronics Standards Association (VESA). Note that the compression/decompression units 303 may be omitted.

Furthermore, the compression/decompression units 303 may change a compression method or a decompression method according to the state of the transmission path Tm. For example, the higher the compression rate, the higher the latency of the compression/decompression units 303.

Therefore, in order to achieve a low latency, the compression/decompression units 303 do not perform any compression, or use a compression method with a low compression rate, for example. The compression/decompression units 303 are connected to the mapping/demapping units 304.

The compression/decompression units 403 perform reverse processing to the compression/decompression units 303 under the control of the monitoring control unit 401. The compression/decompression units 403 are connected to the mapping/demapping units 404.

Each of the mapping/demapping units 304 converts a UI signal into a signal form capable of long-distance transmission under the control of the monitoring control unit 301. The signal form is, for example, OTN defined by ITU-T. The mapping/demapping units 304 are connected to the multiplexing/demultiplexing unit 305.

Each of the mapping/demapping units 404 converts a UI signal into a signal form capable of long-distance transmission under the control of the monitoring control unit 401. The mapping/demapping units 404 are connected to the multiplexing/demultiplexing unit 405.

The multiplexing/demultiplexing unit 305 multiplexes and demultiplexes a plurality of signals under the control of the monitoring control unit 301. For example, when OTN is used as a signal form capable of long-distance transmission, the multiplexing/demultiplexing unit 305 multiplexes a plurality of optical data unit (ODU) signals output from the mapping/demapping units 304 into an ODU having a larger capacity. The multiplexing/demultiplexing unit 305 is connected to the delay measurement unit 308.

The multiplexing/demultiplexing unit 405 performs reverse processing to the multiplexing/demultiplexing unit 305 under the control of the monitoring control unit 401. The multiplexing/demultiplexing unit 405 is connected to the delay measurement unit 308 (408).

The delay measurement unit 308 (408) measures a delay between the delay measurement unit 308 (408) and the delay measurement unit of the opposite UI transmission/reception device. The delay measurement method is, for example, ODU Delay Measurement (ODU DM) defined by OTN. In addition, the delay measurement unit 308 (408) gives a delay as necessary. The delay measurement unit 308 (408) is connected to the transmission/reception unit 306 (406). Note that the delay measurement unit 308 (408) may be provided between the mapping/demapping units 304 (404) and the multiplexing/demultiplexing unit 305 (405). In this case, it is also possible to adjust a delay independently for each UI signal or sensor signal.

The transmission/reception unit 306 transmits and receives a signal to be transmitted through the second network $NW^2$ under the control of the monitoring control unit 301. For example, in the case of OTN, the transmission/reception unit 306 transmits and receives an optical-channel transport unit (OTU) signal. The transmission/reception unit 306 is connected to the second network NW2, and is connected to the UI transmission/reception device 43 in the user base 4 via the allocation device 33, the switching device 34, and the transmission path Tm. The capacity of information to be transmitted and received is compliant with, for example, OTU0LL, OTU1, OTU2, OTU2e, OTU3, OTU4, OTUCn, Gigabit Ethernet (GbE), 2.5 GbE, 5 GbE, 10 GbE, 25 GbE, 50 GbE, 100 GbE, 400 GbE, or the like. Note that the transmission/reception unit 306 may change the capacity according to the state of the transmission path Tm.

The transmission/reception unit 406 transmits and receives information to and from the computing machine base 3 via the transmission path Tm under the control of the monitoring control unit 401.

The delay control device 2 then acquires delay amount information from the plurality of UI transmission/reception devices 32 (or 43). Note that, in the example of FIG. 10, the delay amount is a delay time between the UI transmission/reception device 32 and the UI transmission/reception device 43. Note that the delay amount may be measured under the control of the computing machine 31 in the computing machine base 3.

First Example

Figure 11:
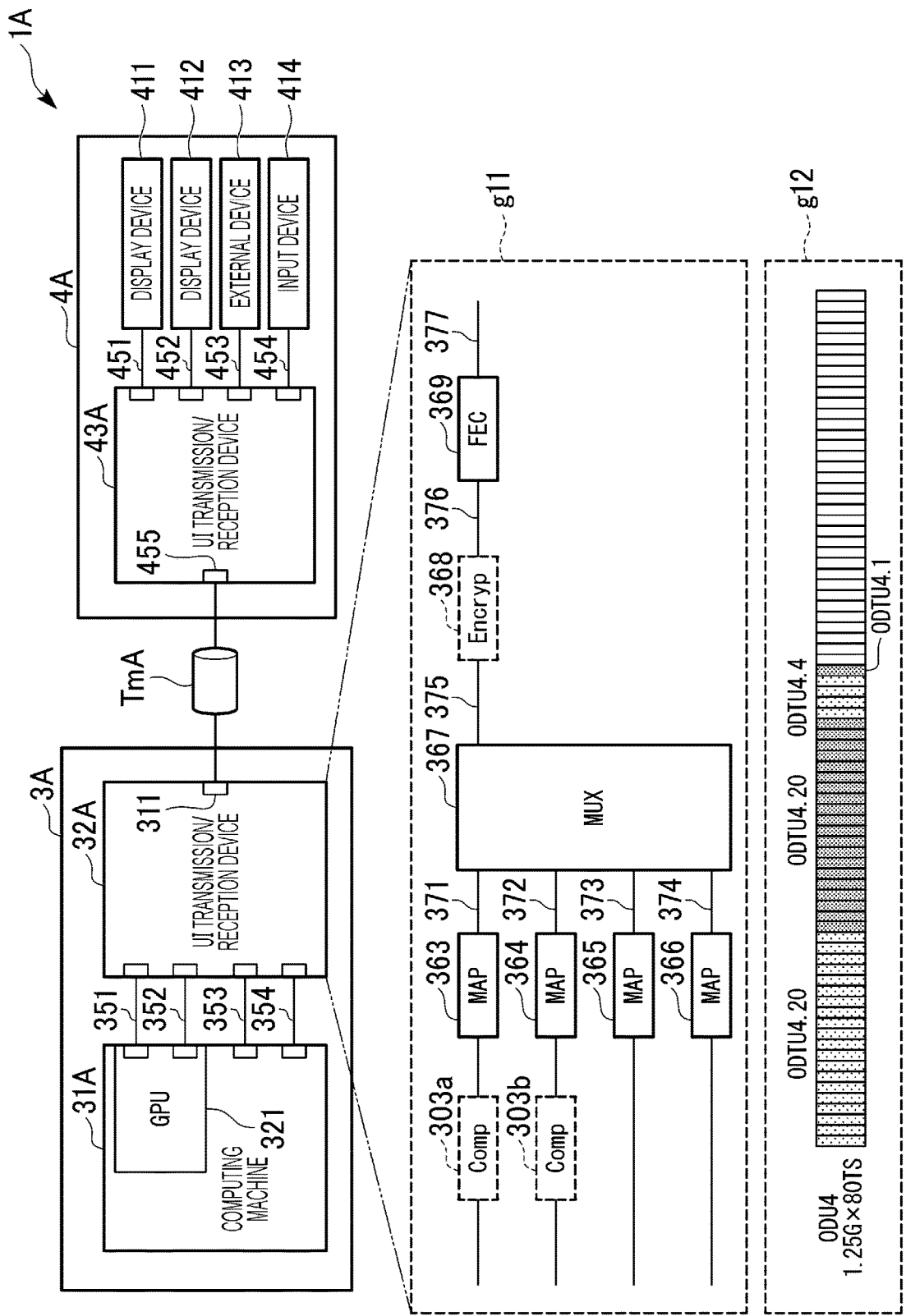
FIG. 11 is a diagram illustrating a first specific configuration example of the information processing system.

FIG. 11 is a diagram illustrating a specific first configuration example of the information processing system. In the example of FIG. 11, a graphic board (including a GPU 321) is mounted on a computing machine 31A installed in a computing machine base 3A, and DisplayPort signals are output as video signals. A plurality of terminals may be mounted on the graphic board, and for example, two systems of DisplayPort signal lines 351 and 352 may be simultaneously used as illustrated in FIG. 11. Note that a plurality of graphic boards may be mounted on one computing machine, and a plurality of terminals may be used by one user or a plurality of users. Furthermore, the computing machine 31A exchanges operation information and the like with USB (for example, USB 2.0 or USB 3.2) terminals via signal lines 353 and 354. In addition, a UI transmission/reception device 32A in the computing machine base 3A and a UI transmission/reception device 43A in a user base 4A are connected via, for example, an input/output port (I/O) 311 compliant with the QSFP 28 standard and a transmission path TmA.

The function of the UI transmission/reception device 32A is implemented in, for example, an application specific integrated circuit (ASIC) or a field programmable gate array (FPGA). FIG. 11 illustrates an example in which various signals are accommodated and multiplexed in OTN by use of the FPGA in the UI transmission/reception device 32A.

Signals transmitted from the UI transmission/reception device 32A are transmitted through the optical fiber transmission path TmA and sent to the UI transmission/reception device 43A in the user base 4A. Note that the transmission path TmA may be single-core bidirectional or double-core bidirectional. In addition, the transmission path may be different depending on the transmission direction. For example, a downstream transmission path may be a passive optical network (PON), and an upstream transmission path may be a transmission path compliant with the fourth generation communication standard or the fifth generation communication standard.

The UI transmission/reception device 43A restores the original signals by processing reverse to that on the transmission side. The restored signals, here, signals of display ports 451 and 452, USB 3.0 (413), and USB 2.0 (414) are output from the UI transmission/reception device 43A, and are connected to a display device 411, a display device 412, an external device 413, and an input device 414. Examples of the external device 413, which is a USB device, and the input device 414, which is a USB device, include input/output devices such as a keyboard, a mouse, and a gaming controller, a mass storage device, an audio interface, a camera, and various sensors. Note that a device connected to the UI transmission/reception device 43A is not limited thereto. Similarly, even in the following configuration examples, a device connected to a UI transmission/reception device in a user base is not limited thereto.

Although the flow of the signals from the UI transmission/reception device 32A in the computing machine base 3A to the UI transmission/reception device 43A in the user base 4A has been described, data can be transferred in the reverse direction by similar signal processing.

Next, an example in which the UI transmission/reception device 32A is implemented in the FPGA will be described with reference to FIG. 11. Note that in an implementation example g1*l* and the following examples, Comp is an abbreviation for Compression, MAP is an abbreviation for Mapping, MUX is an abbreviation for Multiplexing, Encryp is an abbreviation for Encryption, and FEC is an abbreviation for Forward Error Correction.

The FPGA implements functions of OTN as illustrated in the implementation example g11. There are various conceivable resolutions, refresh rates, and color depths of the video signals. For example, in a case of a 4K resolution, 120 (fps) (frames per second), and 24 (bpp) (bits per pixel) in DisplayPort 1.4, the bit rate is about 26 (Gbps). Compression/decompression units (Comp) 303 (303*a*, 303*b*) compress the signals as necessary. The compression is performed by, for example, VESA DSC. In a case where VESA DSC is used, compression is performed at 3:1, and the bit rate can be reduced to about 8.7 (Gbps). In a case where the compression is not performed, there is an advantage of low latency because it does not take time for the compression processing, but on the other hand, the transfer capacity increases. On the other hand, in a case where the compression is performed, the compression processing takes time, and thus the latency is increased as compared with the case of non-compression, but there is an advantage that the transfer capacity can be reduced.

Note that the bit rate of an image is, for example, 4.67 (Gbps) in the case of 1080p 240 (Hz) DSC, 8.61 (Gbps) in the case of 4K 120 (Hz) 24 (bpp) DSC, and 49.65 (Gbps) in the case of 8K 60 (Hz) 24 (bpp).

Here, processing in the case of non-compression will be described.

The DisplayPort signals are accommodated in ODU frames by a mapping function (MAPs 363 to 366) of OTN. Note that a mapping/demapping unit 304 has the mapping function. For the mapping, for example, the Bit-synchronous Mapping Procedure (BMP), the Asynchronous Mapping Procedure (AMP), or the Generic Mapping Procedure (GMP) defined by OTN can be applied.

The signals accommodated in the ODUs are multiplexed into an upper ODU frame by a multiplexing function (MUX 367) of OTN. When a signal of about 26 (Gbps) is multiplexed in a case where the upper ODU is an ODU4, the signal can be multiplexed into 20 tributary slots, that is, ODTU 4.20 because the size of a tributary slot of the ODU4 is 1.302 (Gbps). In the implementation example g11, for example, a multiplexing hierarchy between the MAPs 363 to 365 and the MUX 367 is ODUflex (371 to 373), and a multiplexing hierarchy between the MAP 366 and the MUX 367 is ODU0 (374). Furthermore, a multiplexing hierarchy between the MUX 367 and an Encryp 368, a multiplexing hierarchy between the Encryp 368 and an FEC 369, and a multiplexing hierarchy of the FEC 377 and the I/O 311 compliant with the QSFP 28 standard are ODU4 (375, 376, 377). Note that the Encryp 368 performs encryption processing. The FEC 369 performs error correction coding processing.

Here, a USB signal will be described.

In the example of FIG. 11, a USB 3.0 signal and a USB 2.0 signal are illustrated. The bit rate of the USB 3.0 signal is 5 (Gbps), and the bit rate of the USB 2.0 signal is 480 (Mbps). Similar to the case of DisplayPort, the USB signals are first accommodated in ODU frames by the mapping function of OTN, and are then multiplexed into a required number of tributary slots of the upper ODU frame. In a case where the upper ODU is the ODU4, the USB 3.0 signal can be multiplexed into four tributary slots, and the USB 2.0 signal can be multiplexed into one tributary slot.

An example of usage of tributary slots of the ODU4 is illustrated in an area surrounded by a reference sign g12 in FIG. 11. As long as there is an empty tributary slot, signals other than those illustrated here can be multiplexed. After being multiplexed, the signals are encrypted as necessary. The ODU is then given an error correction code (FEC) and is output as an OTU4 signal from the UI transmission/reception device. In order to transmit and receive the OTU4 signal from the UI transmission/reception device 32A, it is possible to use, for example, a 100G optical module compliant with the QSFP 28 standard or an electric cable with QSFP 28 connectors at both ends (Direct Attachment Cable; DAC).

Second Example

Figure 12:
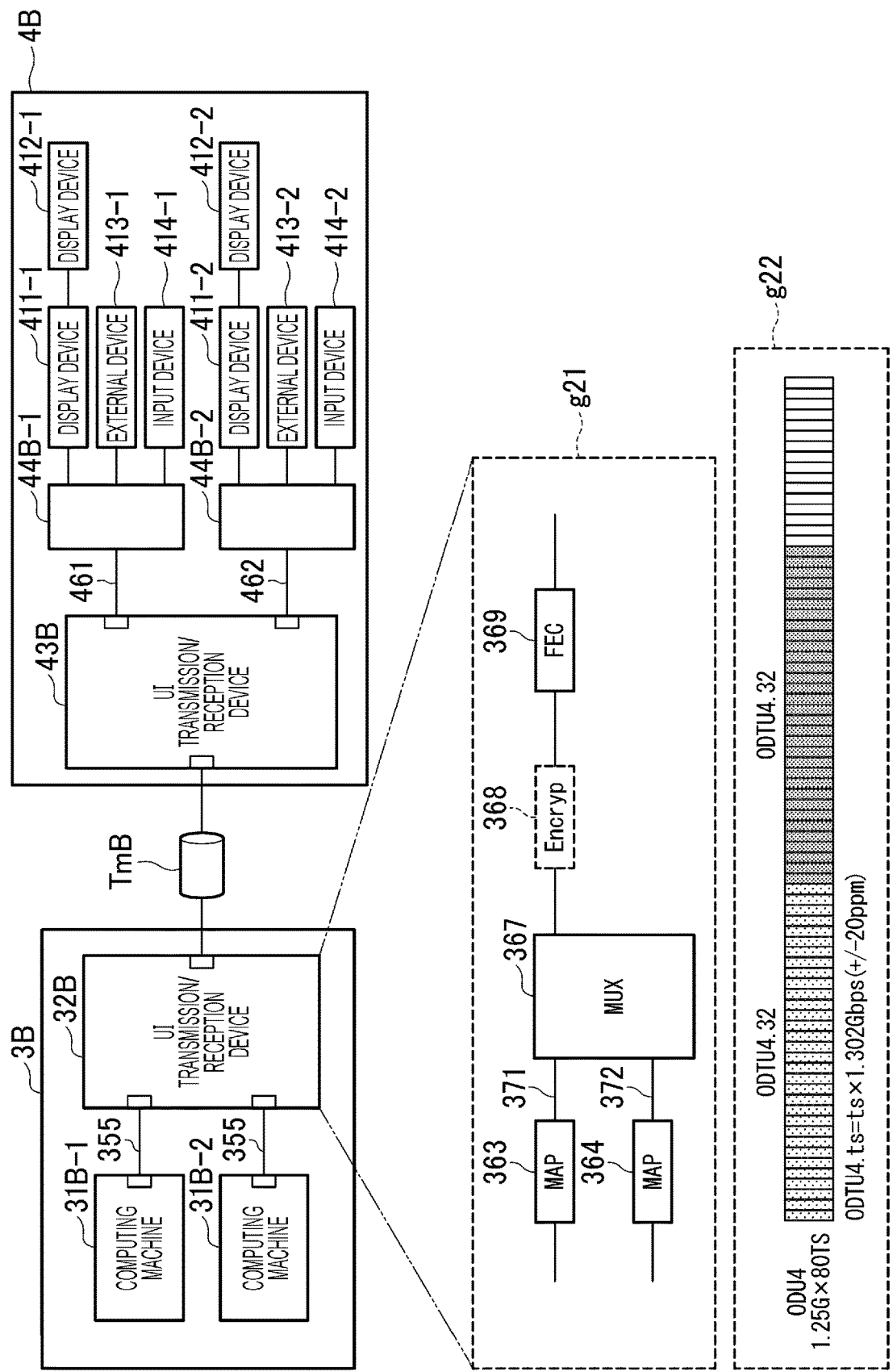
FIG. 12 is a diagram illustrating a second specific configuration example of the information processing system.

FIG. 12 is a diagram illustrating a specific second configuration example of the information processing system. In the example of FIG. 12, signal lines 355 of computing machines 31B (31B-1, 31B-2) in a computing machine base 3B are signal lines that transmit signals compliant with the Thunderbolt 3 standard. The computing machines 31B and a UI transmission/reception device 32B are connected by the signal lines 355. Note that, in a Thunderbolt 3 signal, a video signal, a USB signal, and the like are multiplexed, and thus only transferring the Thunderbolt 3 signal makes it possible to transmit and receive both a video signal and a USB signal. As in a region surrounded by a reference sign g22 in FIG. 12, the Thunderbolt 3 signals are accommodated in ODU frames, are then multiplexed into an upper ODU, and are transmitted from the UI transmission/reception device 32B to a user base 4B, as in the first example.

Note that, as illustrated in FIG. 12, the UI transmission/reception device 32B may be connected to the plurality of computing machines 31B (31B-1, 31B-2), and signals from the computing machines 31B may be multiplexed and transmitted.

A transmission path TmB between the computing machine base 3B and the user base 4B is, for example, OUT4 or OTL4.4.

A UI transmission/reception device 43B in the user base 4B is connected to Thunderbolt 3 docks 44B (44B-1, 44B-2). The Thunderbolt 3 docks 44B demultiplex the multiplexed signal. One or more display devices 411 (411-1, 411-2) and 412 (412-1, 412-2), an external device 413 (413-1, 413-2) as a USB 3.0 device, and an input device 414 (414-1, 414-2) such as a keyboard and a mouse are connected to each of the Thunderbolt 3 docks 44B.

Third Example

Figure 13:
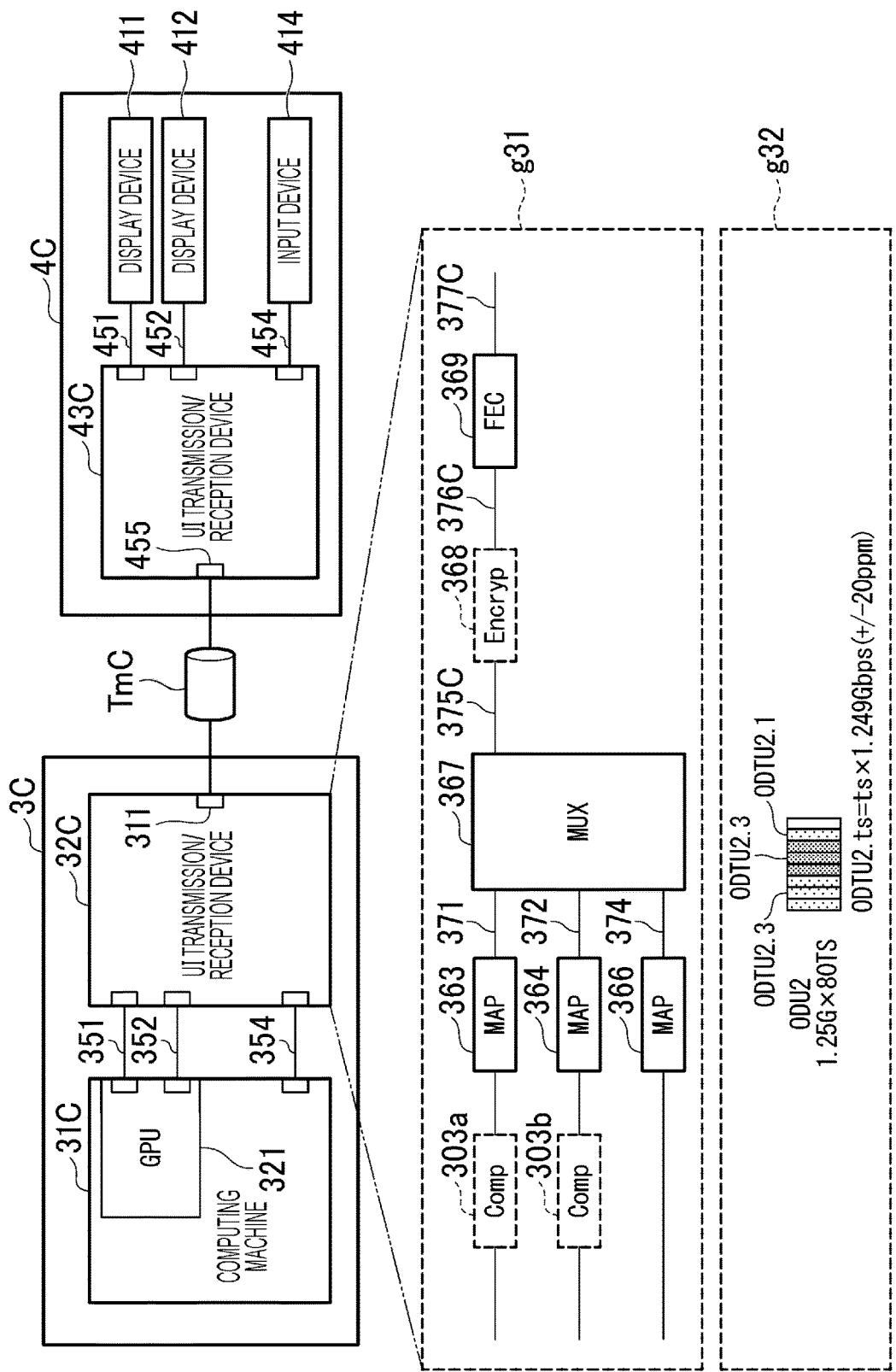
FIG. 13 is a diagram illustrating a third specific configuration example of the information processing system.

FIG. 13 is a diagram illustrating a third specific configuration example of the information processing system. In the example of FIG. 13, two systems of DisplayPort signals are input and output from a computing machine 31C in a computing machine base 3C via the signal lines 351 and 352, and one system of USB 2.0 signal is input and output via the signal line 354. These signals are input to a UI transmission/reception device 32C. In this example, a case of a video signal of 1080p, 60 (fps), and 24 (bpp) is illustrated. In this case, the bit rate of the video signal is about 3.2 (Gbps). The bit rate of a USB 2.0 signal is 480 (Mbps).

These signals are first mapped to ODU frames as in the first and second examples. The ODU signals are multiplexed into an upper ODU. Here, an ODU2 signal is used as the upper ODU. The capacity of a tributary slot of the ODU2 is 1.249 (Gbps), and the ODUs to which the signals are mapped are multiplexed into a necessary number of tributary slots, as in a region surrounded by a reference sign g32 in FIG. 13. An ODU in which a DisplayPort signal is accommodated is multiplexed into three tributary slots, that is, ODTU 2.3. An ODU in which a USB 2.0 signal is accommodated is multiplexed into one tributary slot, that is, ODTU 2.1.

As in an area surrounded by a reference sign g31 in FIG. 13, the UI transmission/reception device 32C encrypts the ODU2 signal as necessary, adds an error correction code to the ODU2 signal, and then transmits the ODU2 signal to which the error correction code is added, which is an OTU2 signal, from, for example, an optical module 311C of 10 (Gbps), which is called SFP+.

A transmission path TmC between the computing machine base 3C and a user base 4C is, for example, OTU2 (LR). Note that the transmission path TmC may be single-core bidirectional or double-core bidirectional.

A UI transmission/reception device 43C in the user base 4C restores the original signals by processing reverse to the transmission side. The restored signals, here, signals of the display port 451, the display port 452, and USB 2.0 (454) are output from the UI transmission/reception device 43C, and are connected to the display devices 411 and 412 and, for example, the input device 414, which is a USB 2.0 device.

Fourth Example

Figure 14:
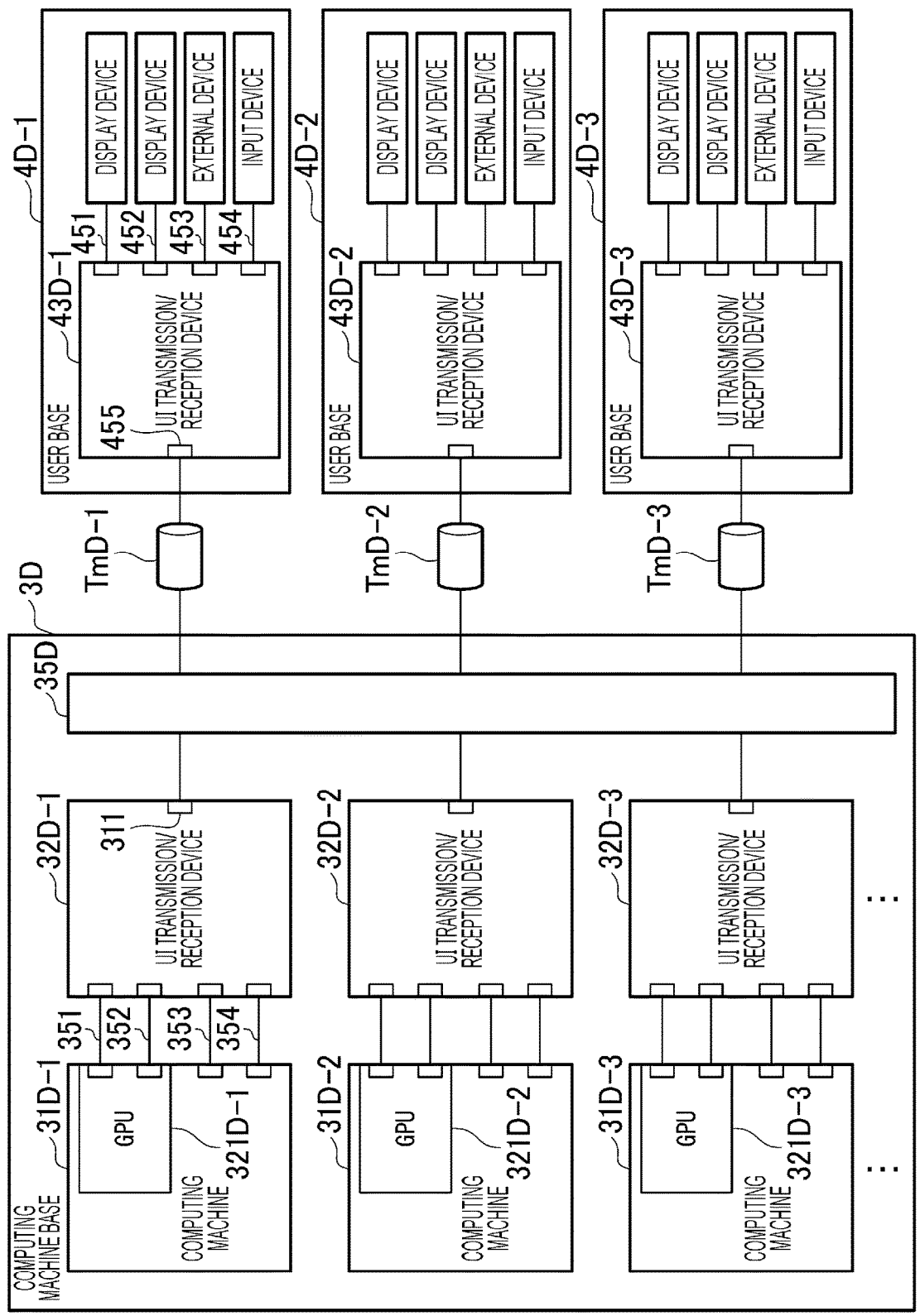
FIG. 14 is a diagram illustrating a fourth specific configuration example of the information processing system.

FIG. 14 is a diagram illustrating a fourth specific configuration example of the information processing system.

In the example of FIG. 14, a plurality of computing machines 31D (31D-1, 31D-2, 31D-3, . . . ) and a plurality of UI transmission/reception devices 32D (32D-1, 32D-2, 32D-3, . . . ) are installed in a computing machine base 3D.

In this example, the performances of graphic board GPUs 321D (321D-1, 321D-2, 321D-3) of the three computing machines 31D-1, 31D-2, and 31D-3 are different. For example, the GPU 321D-1 is a high performance graphic board, the GPU 321D-2 is a medium performance graphic board, and the GPU 321D-3 is a low performance graphic board.

As in the first to third examples, the computing machines 31D are connected to the UI transmission/reception devices 32D. An optical switch 35D (switch) is connected to outputs of the UI transmission/reception devices 32D. The optical switch is, for example, a robot patch panel that changes a connection relationship of optical connectors by operating a robot arm. The optical switch is connected to transmission paths TmD (TmD-1, TmD-2, TmD-3, . . . ), and is connected to UI transmission/reception devices 43D (43D-1, 43D-2, 43D-3, . . . ) in user bases 4D (4D-1, 4D-2, 4D-3, . . . ). Note that each of the transmission paths TmD is, for example, OTU4 or OTL4.4 (LR4).

The UI transmission/reception devices 43D in the user bases 4D are connected to display devices, external devices such as USB 3.0 devices, and input devices such as USB 2.0 devices, as in the first to third examples.

Here, in a case where a user uses high-performance graphic performance at a first time, the connection relationship between the UI transmission/reception devices 32D and the UI transmission/reception devices 43D is changed by the optical switch 35D under the control of the delay control device 2, so that one of the computing machines 31D to be used can be selected.

In a case where the same user uses one computing machine for an application that only needs low graphic performance at a second time, the connection relationship between the UI transmission/reception devices 32D and the UI transmission/reception devices 43D is changed by the optical switch under the control of the delay control device 2, so that an appropriate one of the computing machines 31D can be used.

Fifth Example

Figure 15:
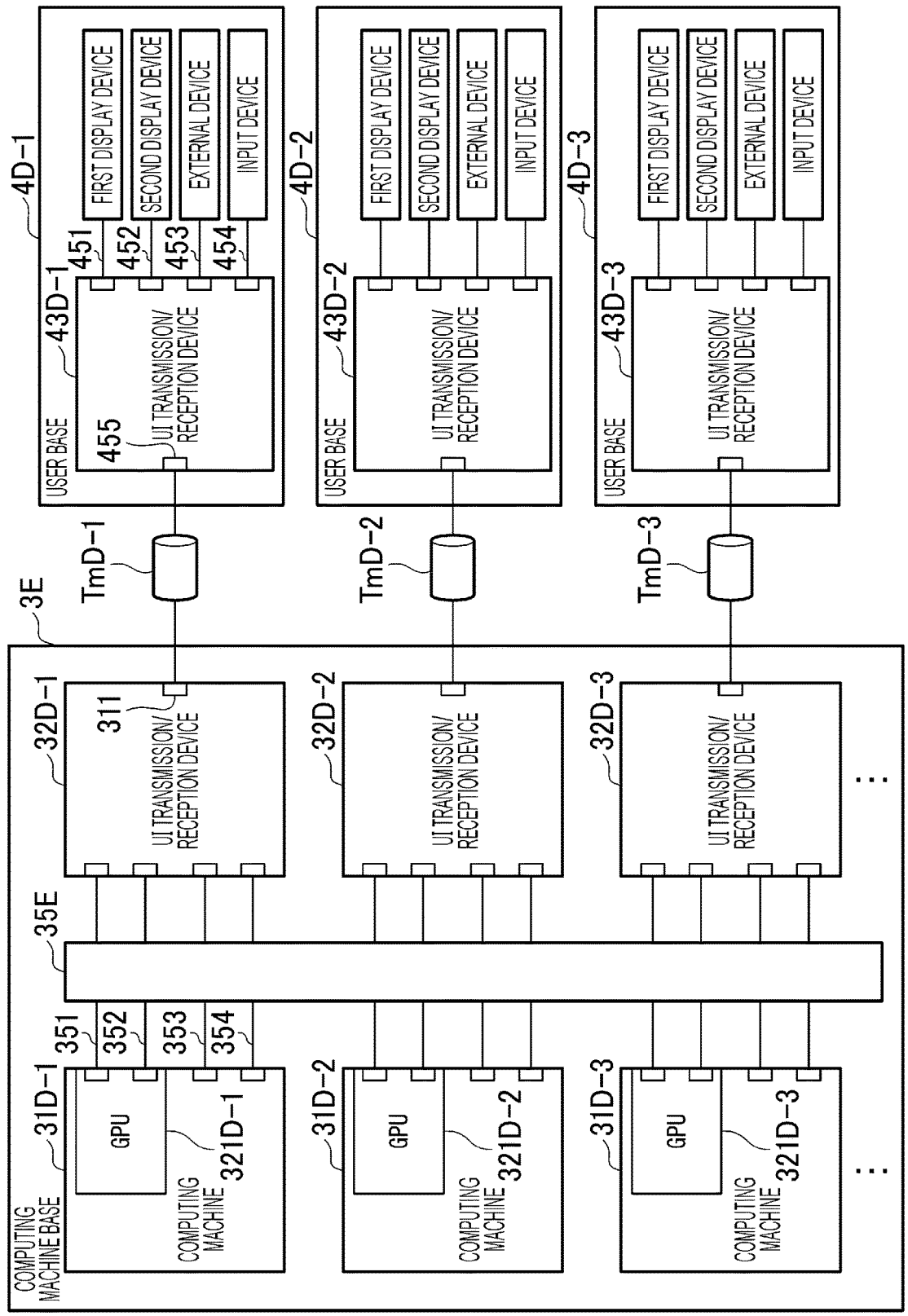
FIG. 15 is a diagram illustrating a fifth specific configuration example of the information processing system.

The mechanism for changing a computing machine to be used is not limited to the configuration using the optical switch 35D illustrated in FIG. 14 in the fourth embodiment. FIG. 15 is a diagram illustrating a fifth specific configuration example of the information processing system. In the example of FIG. 15, a switch 35E is provided between the computing machines 31D (31D-1, 31D-2, 31D-3, . . . ) and the UI transmission/reception devices 32D (32D-1, 32D-2, 32D-3, . . . ) in a computing machine base 3E. The switch 35E is, for example, a display (DP) and a USB switch or the like, and is controlled by the delay control device 2, so that switching is performed.

Sixth Example

Figure 16:
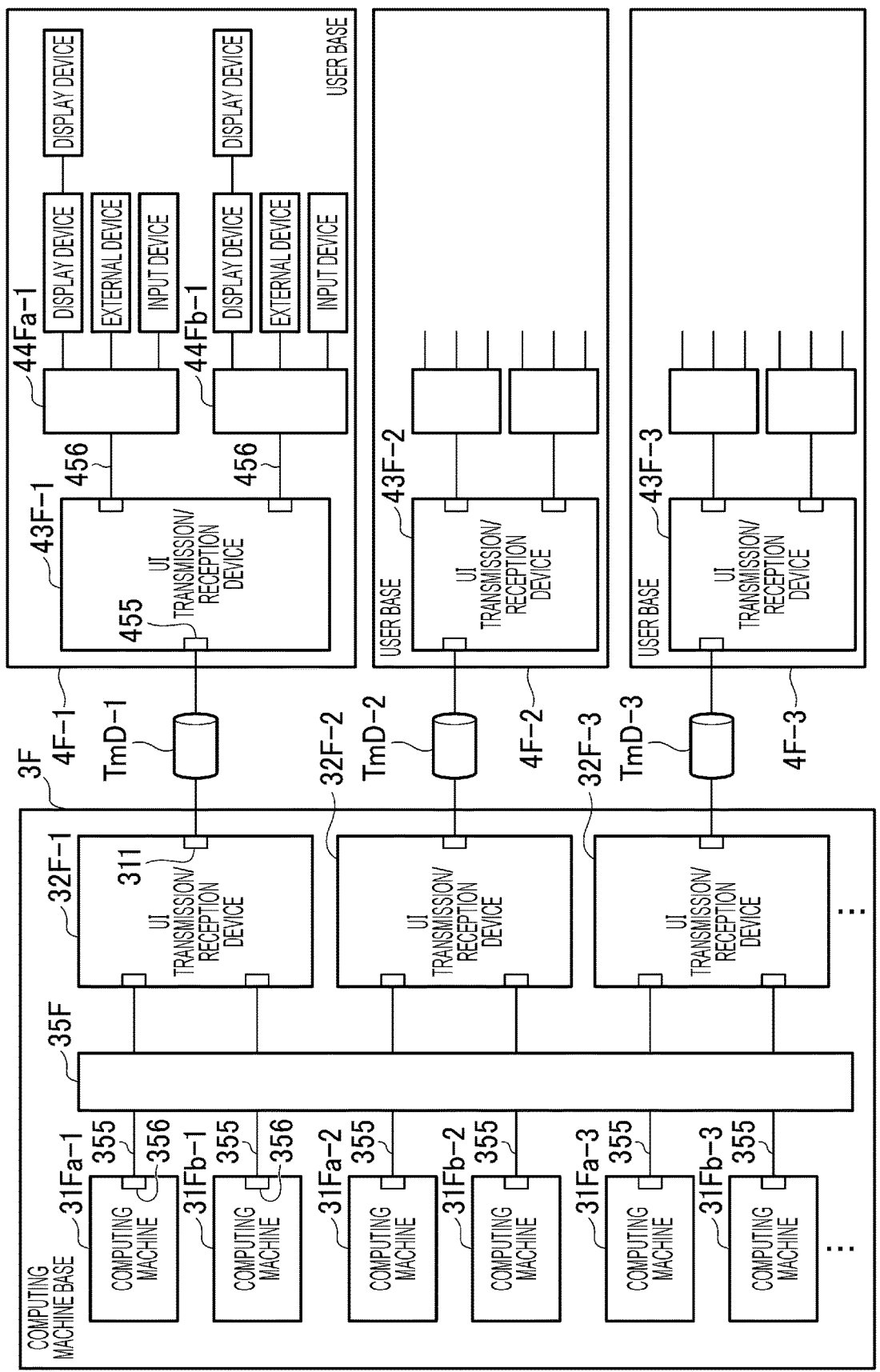
FIG. 16 is a diagram illustrating a sixth specific configuration example of the information processing system.

Furthermore, the optical switch 35D illustrated in FIG. 14 in the fourth example may be a Thunderbolt 3 switch 35F (switch) as illustrated in FIG. 16. FIG. 16 is a diagram illustrating a sixth specific configuration example of the information processing system. In the example of FIG. 16, the Thunderbolt 3 switch 35F is provided between computing machines 31F (31Fa-1, 31Fb-1, 31Fa-2, 31Fb-2, 31Fa-3, 31Fb-3, . . . ) and UI transmission/reception devices 32F (32F-1, 32F-2, 32F-3, . . . ) in a computing machine base 3F.

In this case, each of output ports 356 of the computing machines 31F is, for example, a port of the USB Type-C, and the computing machines 31F and the Thunderbolt 3 switch 35F are connected by the signal lines 355 compliant with the Thunderbolt 3 standard or the like.

Note that, for example, the computing machines 31F-1 (31Fa-1, 31Fb-1) are high-performance graphic boards, the computing machines 31F-2 (31Fa-2, 31Fb-2) are medium-performance graphic boards, and the computing machines 31F-3 (31Fa-3, 31Fb-3) are low-performance graphic boards.

Furthermore, in user bases 4F (4F-1, 4F-2, 4F-3, . . . ), ports of UI transmission/reception devices 43F (43F-1, 43F-2, 43F-3, . . . ) are connected to Thunderbolt 3 docks 44F (44Fa-1, 44Fb-1, 44Fa-2, 44Fb-2, 44Fa-3, 44Fb-3, . . . ) via signal lines 456. Note that switching control of the Thunderbolt 3 docks 44F is performed by the delay control device 2.

In addition, the configurations of the user bases 4F-1, 4F-2, and 4F-3 may be the same or different.

Seventh Example

Figure 17:
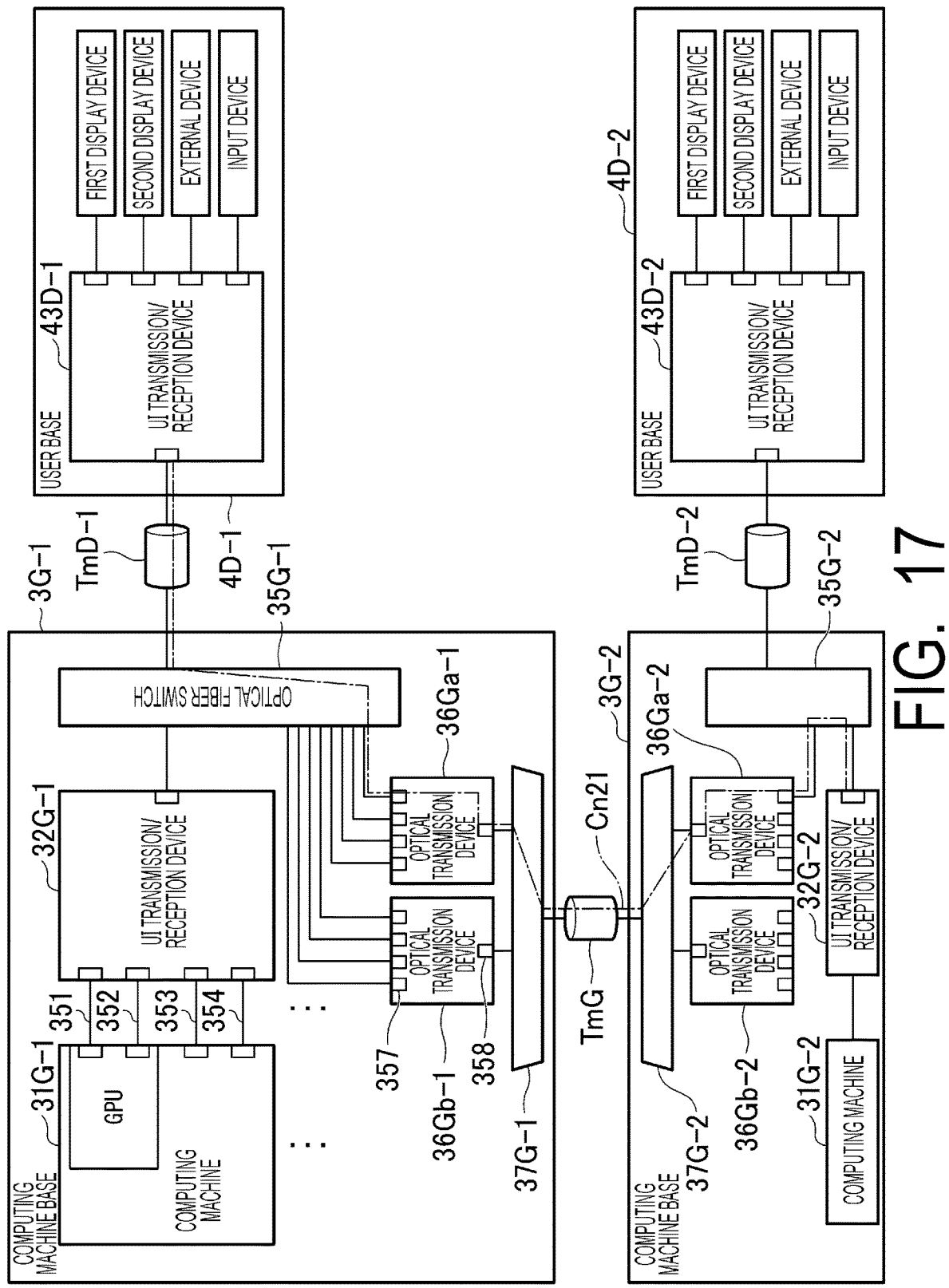
FIG. 17 is a diagram illustrating a seventh specific configuration example of the information processing system, in which a plurality of computing machine bases are connected to each other.

FIG. 17 is a diagram illustrating a seventh specific configuration example of the information processing system, in which a plurality of computing machine bases are connected to each other.

Here, with reference to FIG. 17, a case will be described where, when a user in the user base 4D-1 tries to use one of computing machines 31G having desired performance, all the computing machines 31G having performance requested by the user are used by other users and there is no free computing machine in a computing machine base 3G-1, which is directly connected from the user base 4D-1 via a transmission path, or the computing machines 31G having desired performance are not installed.

In this case, it is assumed that a computing machine 31G having performance desired by the user is installed in a computing machine base 3G-2 and is available.

In this case, a signal from the UI transmission/reception device 43D-1 in the user base 4D-1 is connected to an optical switch 35G-1 in the computing machine base 3G-1, which is directly connected via the transmission path TmD-1, as indicated by the chain line of a path Cn21, under the control of the delay control device 2. In the computing machine base 3G-1, the signal is sent to an optical transmission device 36Ga-1 for communicating with the computing machine base 3G-2 in which the computing machine 31G having performance desired by the user is installed. In the computing machine base 3G-1, after being sent to the optical transmission device 36Ga-1, the signal is subjected to optical multiplexing by an optical multiplexing device 37G-1 as necessary, and reaches the computing machine base 3G-2.

In the computing machine base 3G-2, the signal is demultiplexed by an optical multiplexing device 37G-2, and the demultiplexed signal is input to an optical transmission device 36Ga-2 and is connected to a UI transmission/reception device 32G-2 via an optical fiber switch 35G-2.

Each port of the optical transmission devices 36G (36Ga-1, 36Gb-1, 36Ga-2, 36Gb-2) connected to the optical switches 35G (35G-1, 35G-2) (switches) is, for example, a port compliant with the QSFP 28 standard. In addition, each port of the optical transmission devices 36G (36Ga-1, 36Gb-1, 36Ga-2, 36Gb-2) connected to the optical multiplexing devices 37G (37G-1, 37G-2) is, for example, a port compliant with the QSFP 56-DD standard.

Furthermore, each of the optical switches 35G (35G-1, 35G-2) is, for example, an optical fiber switch, a robot patch panel, or the like. In addition, the computing machine bases 3G are connected by a transmission path TmG. The transmission path TmG is, for example, an optical fiber cable that transmits a signal compliant with the standard of 400G-ZR (DWDM) or OTU4.

Note that, in FIG. 17, the flow of the signal has been described only in one direction, but the flow is similar in the opposite direction. With the above configuration, it is possible to connect to the UI transmission/reception device 32G in another computing machine base 3G, and it is possible to interchange resources of the computing machines 31G having desired performance.

Eighth Example

Figure 18:
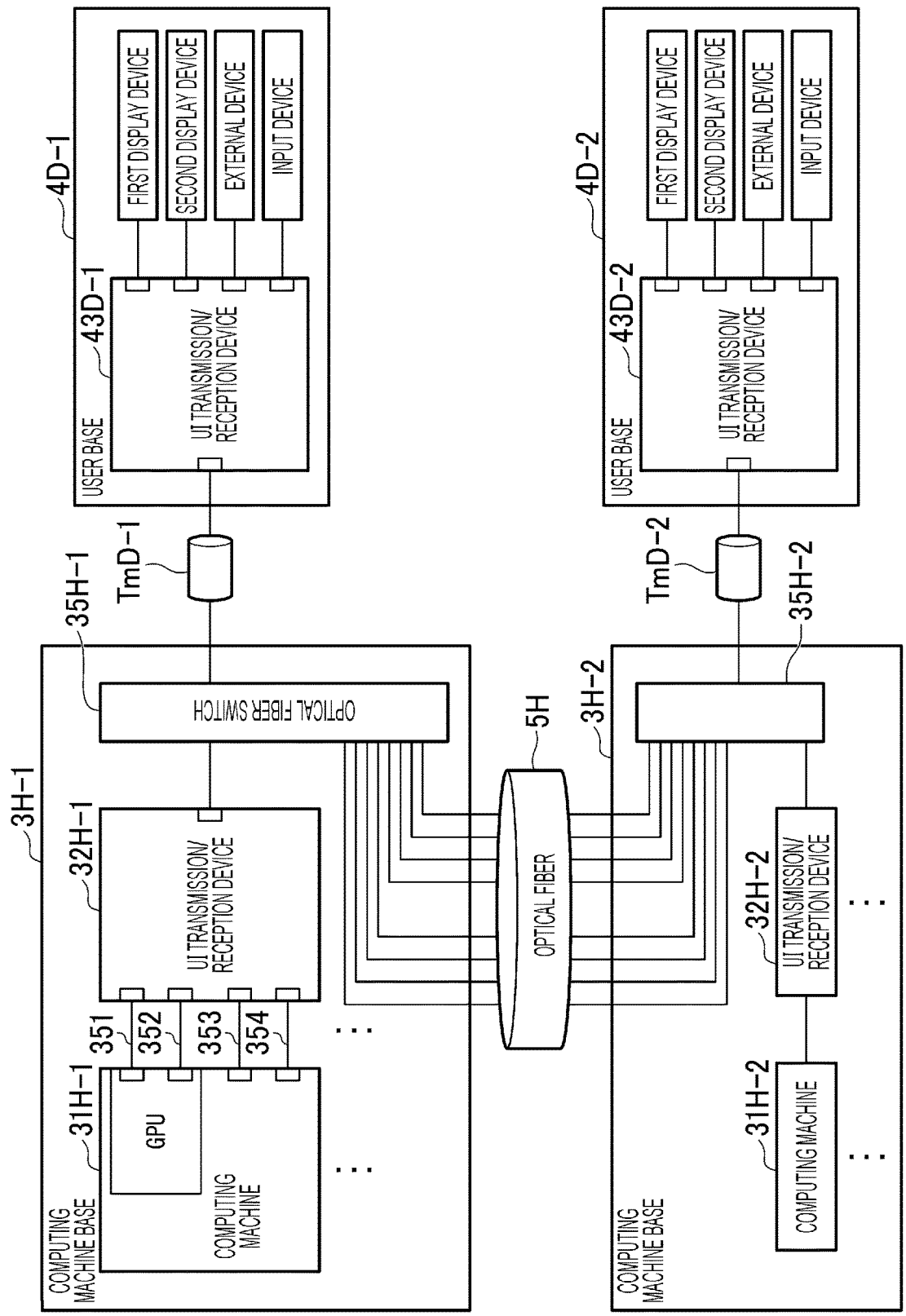
FIG. 18 is a diagram illustrating an eighth specific configuration example of the information processing system, and illustrates another connection example connecting adjacent computing machine bases.

FIG. 18 is a diagram illustrating an eighth specific configuration example of the information processing system, and illustrates another connection example connecting adjacent computing machine bases.

In this example, computing machine bases 3H (3H-1, 3H-2) are connected by a transmission medium 5H such as a multicore optical fiber or a multicore fiber. For example, the UI transmission/reception device 43D-1 in the user base 4D-1 and a UI transmission/reception device 32H-2 in the computing machine base 3H-2 can be connected by the transmission medium 5H. Note that the transmission medium 5H may be a multi-path.

Ninth Example

Figure 19:
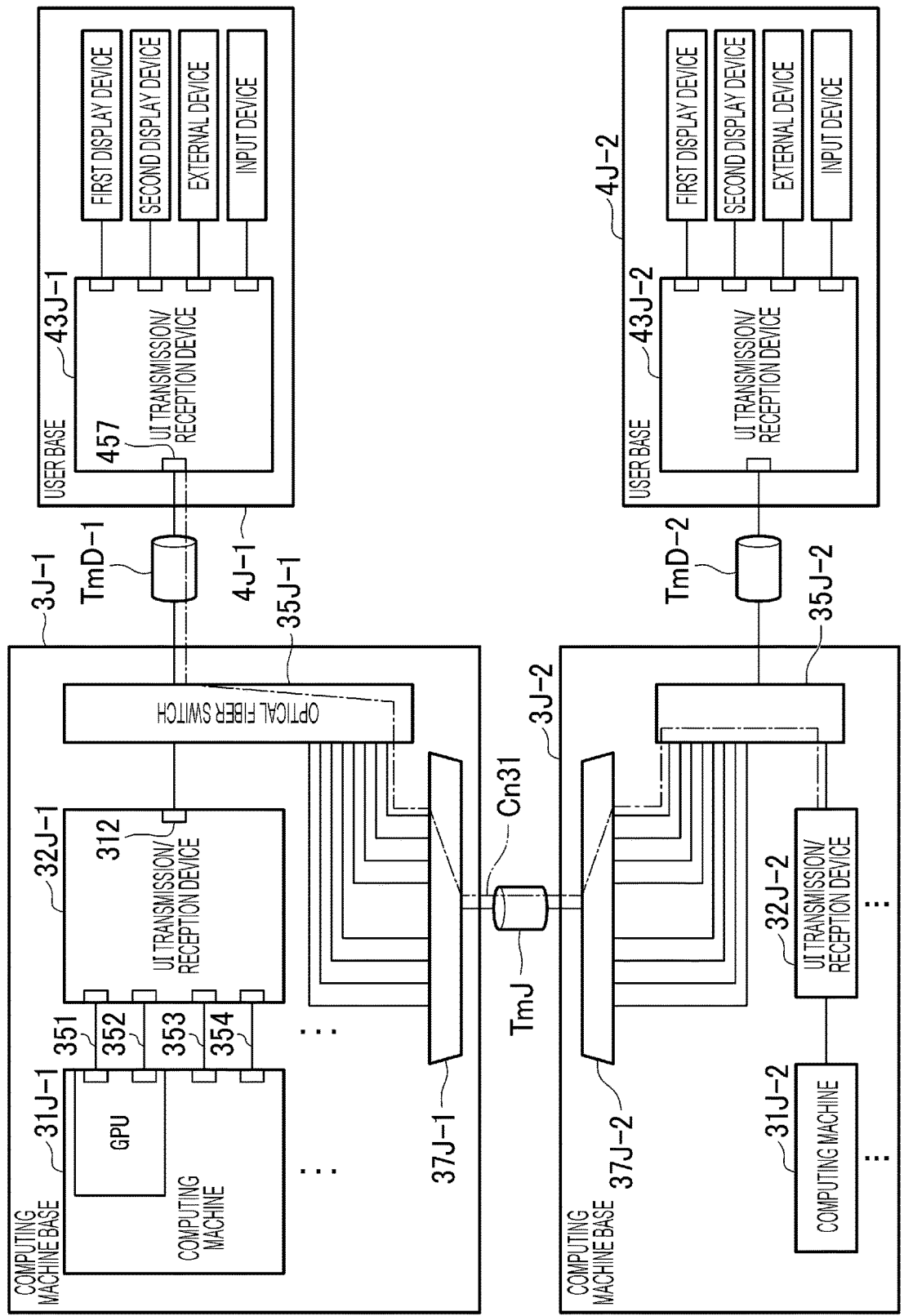
FIG. 19 is a diagram illustrating a ninth specific configuration example of the information processing system, and illustrates another connection example connecting adjacent computing machine bases.
Figure 20:
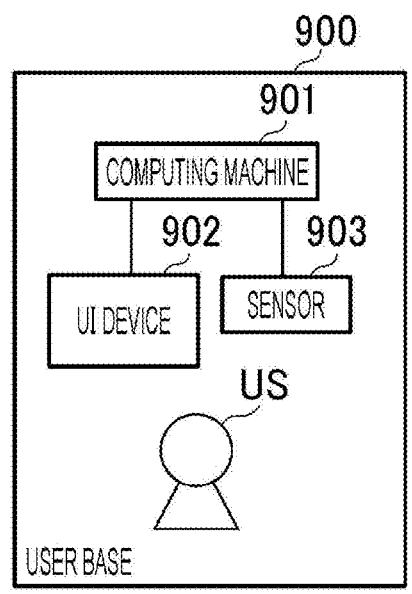
FIG. 20 is a diagram illustrating a configuration example in which a computing machine and a UI device in a conventional technique are directly connected.
Figure 21:
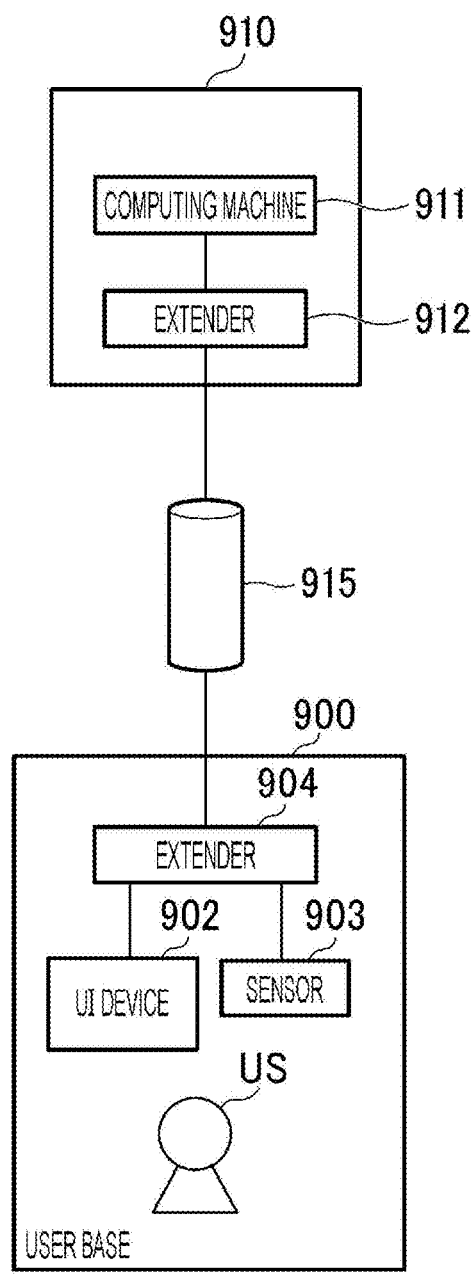
FIG. 21 is a diagram illustrating an example of connection between a UI device and a computing machine using extenders in a conventional technique.
Figure 22:
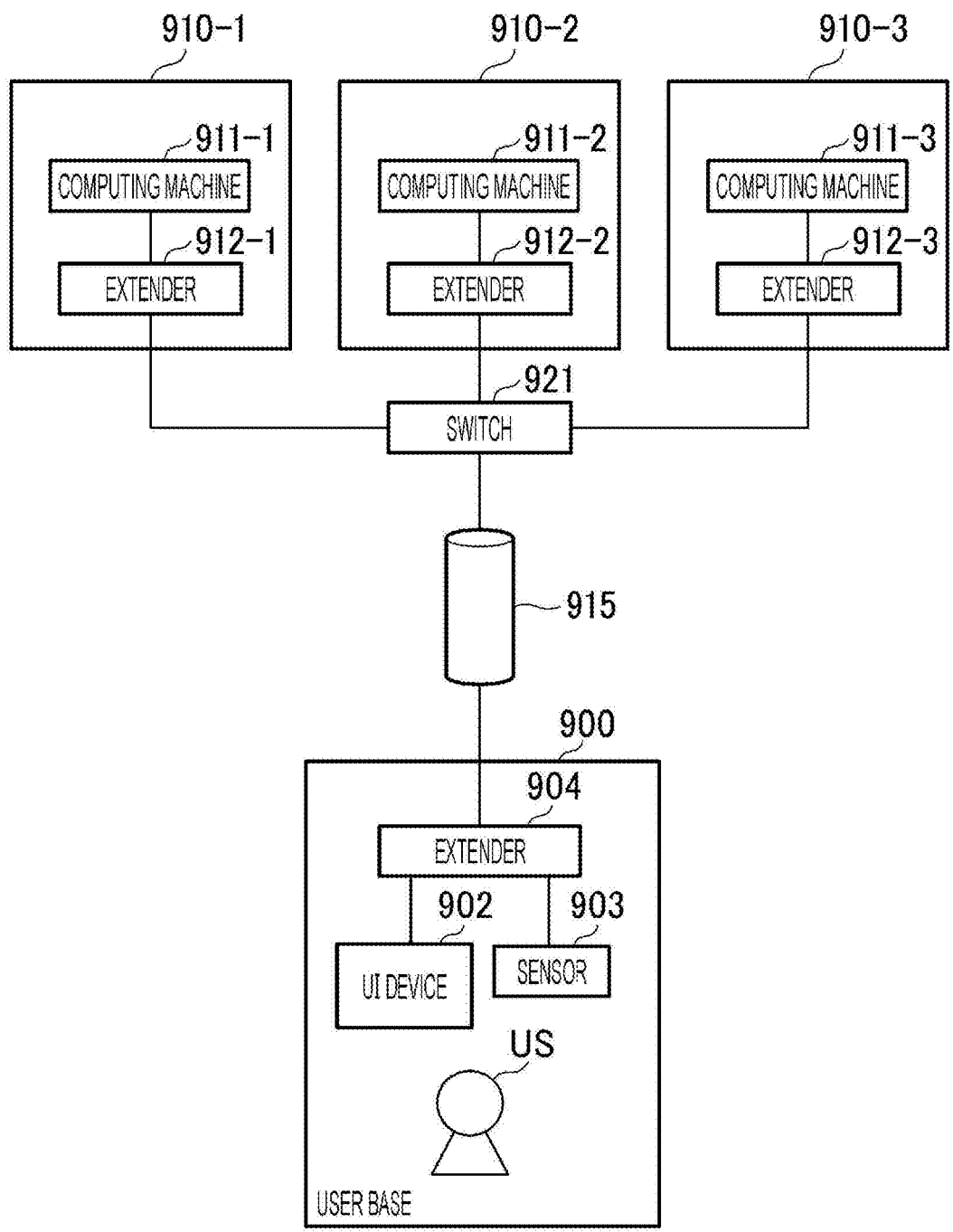
FIG. 22 is a diagram illustrating another example of connection between a UI device and a computing machine using extenders in the conventional technique.
Figure 23:
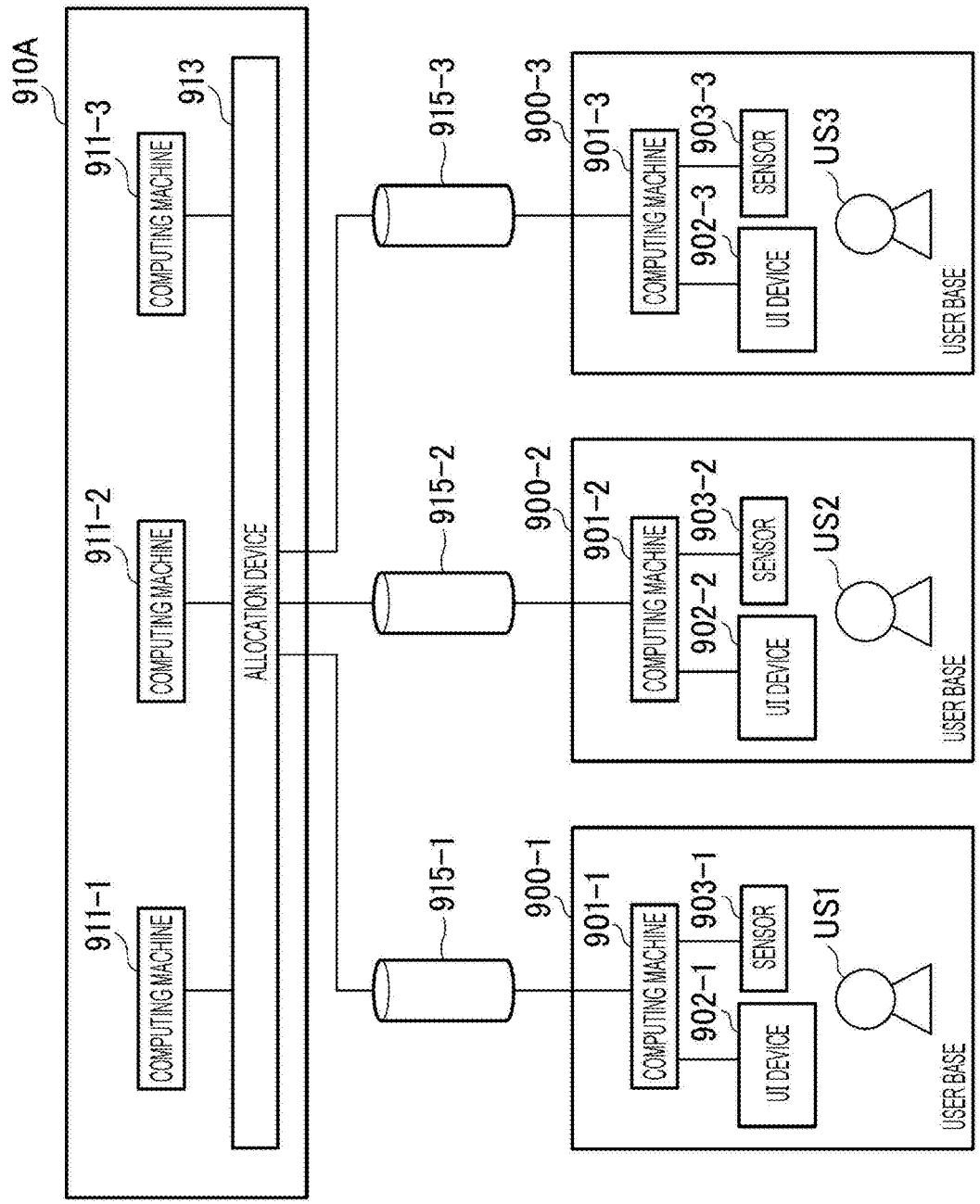
FIG. 23 is a diagram illustrating a configuration example of remote desktop in a conventional technique.

FIG. 19 is a diagram illustrating a ninth specific configuration example of the information processing system, and illustrates another connection example connecting adjacent computing machine bases.

In this example, each of UI transmission/reception devices 43J (43J-1, 43J-2) in user bases 4J (4J-1, 4J-2) includes a WDM interface.

As indicated by a path Cn31, a signal from the UI transmission/reception devices 43J reaches an optical switch 35J-1 in a computing machine base 3J-1, to which the user base 4J-1 is directly connected, via the transmission paths TmD (TmD-1, TmD-2). Note that each of the optical switches 35J (35-J, 35J-2) may be an optical switch, a robot patch switch, or the like. The signal is switched by the optical switch 35J-1, is input to an optical multiplexing device 37J-1 or a reconfigurable optical add drop multiplexer (ROADM) for transmission to an adjacent computing machine base 3J-2, and is transmitted to the adjacent computing machine base 3J-2. The transmitted signal is demultiplexed by an optical multiplexing device 37J-2 or the ROADM, and is connected to a desired UI transmission/reception device 32J-2 via the optical fiber switch 35J-2.

Note that the UI transmission/reception devices 32J (32J-1, 32J-2) in the computing machine bases 3J (3J-1, 3J-2) are connected to the optical switches 35J via CFP2 ports 312, for example. In addition, the UI transmission/reception devices 43J in the user bases 4J are connected to the transmission paths TmD (TmD-1, TmD-2) via CFP2 ports 457, for example.

Furthermore, a transmission path TmJ is, for example, an optical fiber cable or the like that transmits a signal compliant with the OTU4 (WDM) standard.

Note that each implementation example described above is an example, and the implementation configuration is not limited thereto. For example, another device or the like may be connected to the computing machine bases 3 and the user bases 4.

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention is applicable to, for example, a gaming system, an eSports system, a remote desktop system, a rental system for computing machines, and the like.

REFERENCE SIGNS LIST

1 Information processing system
2 Delay control device
3 Computing machine base
4 User base
31 Computing machine
32 UI transmission/reception device
33 Allocation device
34 Switching device
35, 35E, 35F, 35G, 35H, 35J Switch
36 Optical transmission device
37 Optical multiplexing device
41 UI device
42 Sensor
43 UI transmission/reception device
44 Thunderbolt 3 dock
301 Monitoring control unit
302 UI input/output unit
303 Compression/decompression unit
304 Mapping/demapping unit
305 Multiplexing/demultiplexing unit
306 Transmission/reception unit
307 Sensor input/output unit
308 Delay measurement unit
321 GPU
401 Monitoring control unit
402 UI input/output unit
403 Compression/decompression unit
404 Mapping/demapping unit
405 Multiplexing/demultiplexing unit
406 Transmission/reception unit
407 Sensor input/output unit
408 Delay measurement unit
NW1 First network
NW2 Second network
Tm Transmission path

The invention claimed is:

1. An information processing system comprising:
a computing machine installed in a computing machine base;
a first transmission/reception device connected to the computing machine;

a second transmission/reception device installed in a user base used by a user;

a network configured to connect the first transmission/reception device and the second transmission/reception device;

a device connected to the second transmission/reception device; and a delay control device configured to measure a delay amount generated between the first transmission/reception device and the second transmission/reception device and control the measured delay amount, wherein the device is connected to the computing machine via the network.

2. The information processing system according to claim 1, wherein, in a case where there are a plurality of connections between the first transmission/reception device and the second transmission/reception device, the delay control device is configured to measure a delay amount of each of the plurality of connections, and to adjust at least one of the plurality of delay amounts to adjust the plurality of delay amounts to a same amount.

3. The information processing system according to claim 1, wherein the delay control device is configured to adjust the delay amount without interrupting a signal between the first transmission/reception device and the second transmission/reception device when the delay amount is adjusted.

4. The information processing system according to claim 1, wherein a signal between the first transmission/reception device and the second transmission/reception device is encrypted.

5. The information processing system according to claim 1, wherein, in a case where there are a plurality of connections between the first transmission/reception device and the second transmission/reception device, the delay control device is configured to detect an increase or decrease in the number of users, and to readjust the delay amount according to the increase or decrease in the number of users.

6. A delay control device configured to measure a delay amount generated between a first transmission/reception device that is connected to a computing machine installed in a computing machine base and a second transmission/reception device that is installed in a user base used by a user and to which a device used by the user is connected, and to control the measured delay amount, wherein the device is connected to the computing machine via a network configured to connect the first transmission/reception device and the second transmission/reception device.

7. An information processing method in an information processing system comprising a computing machine installed in a computing machine base, a first transmission/reception device connected to the computing machine, a second transmission/reception device installed in a user base used by a user, a network configured to connect the first transmission/reception device and the second transmission/reception device, a device connected to the second transmission/reception device, and a delay control device, the device being connected to the computing machine via the network, the information processing method comprising measuring, by the delay control device, a delay amount generated between the first transmission/reception device and the second transmission/reception device, and controlling the measured delay amount.

8. A non-transitory computer readable storage medium storing a program for causing a computer of a delay control device in an information processing system, which comprises a computing machine installed in a computing machine base, a first transmission/reception device connected to the computing machine, a second transmission/reception device installed in a user base used by a user, a network configured to connect the first transmission/reception device and the second transmission/reception device, a device connected to the second transmission/reception device, and the delay control device, the device being connected to the computing machine via the network, to execute measuring a delay amount generated between the first transmission/reception device and the second transmission/reception device, and controlling the measured delay amount.

9. The information processing system according to claim 1, wherein, the network is a circuit switched network or a packet switched network.

* * * * *